US012711432B2

(12) United States Patent
Valverde, Jr. et al.

(10) Patent No.: US 12,711,432 B2
(45) Date of Patent: Aug. 18, 2026

(54) TRAVEL BOOKING PLATFORM WITH MULTIATTRIBUTE PORTFOLIO EVALUATION

(71) Applicant: Amgine Technologies (US), Inc., Dover, DE (US)

(72) Inventors: L James Valverde, Jr., Washington, DC (US); Jonathan David Miller, Toronto (CA); Harold Roy Miller, Toronto (CA)

(73) Assignee: Amgine Technologies (US), Inc., Austin, TX (US)

( * ) Notice: Subject to any disclaimer, the term of this patent is extended or adjusted under 35 U.S.C. 154(b) by 65 days.

(21) Appl. No.: 18/601,328

(22) Filed: Mar. 11, 2024

(65) Prior Publication Data

US 2024/0242134 A1 Jul. 18, 2024

Related U.S. Application Data

(63) Continuation of application No. 17/106,022, filed on Nov. 27, 2020, now Pat. No. 11,941,552, which is a (Continued)

(51) Int. Cl.
*G06Q 10/02* (2012.01)
*G06F 16/2457* (2019.01)
(Continued)

(52) U.S. Cl.
CPC ..... *G06Q 10/025* (2013.01); *G06F 16/24575* (2019.01); *G06F 16/24578* (2019.01); (Continued)

(58) Field of Classification Search
CPC .... G06Q 10/025; G06Q 10/02; G06Q 10/021; G06Q 10/022; G06Q 10/026; (Continued)

(56) References Cited

U.S. PATENT DOCUMENTS 5,021,953 A * 6/1991 Webber ................ G06Q 10/025 705/6
5,557,524 A 9/1996 Maki
(Continued)

FOREIGN PATENT DOCUMENTS

CA 2830228 C 8/2017
CA 2830224 C 12/2017
(Continued)

OTHER PUBLICATIONS

PR Newswire, "GetGoing Launches Multi-Supplier Hotel Merchandising Platform: BCD Travel Signs Multi-Year Agreement to Streamline Hotel Booking for Travel Management Companies," New York, PR Newswire Association LLC, Sep. 23, 2014.*
(Continued)

*Primary Examiner* — Nathan Erb
(74) *Attorney, Agent, or Firm* — Pequignot + Myers; Matthew A. Pequignot

(57) ABSTRACT

Systems and methods for optimization-based travel itinerary planning utilizing a multiattribute travel booking platform are described herein. The system has a database, a scheduler, a parser, and a processor. The database stores a travel lexicon having attribute names, a travel taxonomy having look-up tables, and user preferences for a user related to travel attributes. The scheduler instantiates the travel attributes in terms of the travel lexicon and indexes them, searches for feasible travel itineraries, and transmits an optimal travel itinerary. The parser parses the travel-related query and ascertains a relevant attribute set, which produces attribute values. The processor receives a travel-related query from a user device, receives the user preferences from the database, ranks and weights the attribute values, associates values to the feasible travel itineraries, scores the feasible travel itineraries, and selects the optimal travel itinerary.

18 Claims, 10 Drawing Sheets

Related U.S. Application Data continuation-in-part of application No. 16/142,834, filed on Sep. 26, 2018, now abandoned, and a continuation-in-part of application No. 14/750,841, filed on Jun. 25, 2015, now Pat. No. 11,049,047.

(60) Provisional application No. 62/574,533, filed on Oct. 19, 2017.

(51) Int. Cl.
*G06F 16/248* (2019.01)
*G06F 16/904* (2019.01)
*G06F 40/205* (2020.01)

(52) U.S. Cl.
CPC .......... *G06F 16/248* (2019.01); *G06F 16/904* (2019.01); *G06F 40/205* (2020.01)

(58) Field of Classification Search
CPC ............... G06Q 10/027; G06Q 10/028; G06Q 10/0281; G06Q 10/0283; G06Q 10/0285; G06Q 10/0287; G06F 16/904; G06F 16/24575; G06F 16/24578; G06F 16/248; G06F 40/205
See application file for complete search history.

(56) References Cited

U.S. PATENT DOCUMENTS

| | | | |
|---|---|---|---|
| 5,797,127 | A | 8/1998 | Walker et al. |
| 5,832,452 | A | 11/1998 | Schneider et al. |
| 5,948,040 | A | 9/1999 | Delorme et al. |
| 6,059,724 | A | 5/2000 | Colin et al. |
| 6,275,808 | B1 | 8/2001 | Demarcken |
| 6,307,572 | B1 | 10/2001 | Demarcken et al. |
| 6,477,520 | B1 | 11/2002 | Malaviya et al. |
| 6,553,310 | B1 | 4/2003 | Lopke |
| 6,795,710 | B1 | 9/2004 | Creemer |
| 7,092,892 | B1 | 8/2006 | Sobalvarro et al. |
| 7,181,438 | B1 | 2/2007 | Szabo |
| 7,219,073 | B1 | 5/2007 | Taylor et al. |
| 7,286,998 | B2 | 10/2007 | Sauser et al. |
| 7,302,398 | B2 | 11/2007 | Ban et al. |
| 7,680,777 | B2 | 3/2010 | Poston et al. |
| 7,860,808 | B2 | 12/2010 | Peters |
| 7,912,734 | B2 | 3/2011 | Kil |
| 7,979,457 | B1 | 7/2011 | Garman |
| 7,983,956 | B1 | 7/2011 | Goel |
| 8,005,685 | B1 | 8/2011 | Biro |
| 8,035,511 | B2 | 10/2011 | Weaver et al. |
| 8,165,920 | B2 | 4/2012 | Goel |
| 8,224,665 | B2 | 7/2012 | Morris |
| 8,332,247 | B1 | 12/2012 | Bailey et al. |
| 8,510,133 | B2 | 8/2013 | Peak et al. |
| 8,600,784 | B1 | 12/2013 | Ivey et al. |
| 8,600,830 | B2 | 12/2013 | Hoffberg |
| 8,631,007 | B1 | 1/2014 | Blandford et al. |
| 8,762,160 | B2 | 6/2014 | Lulla |
| 8,775,426 | B2 | 7/2014 | Mukerjee et al. |
| 9,031,853 | B2 | 5/2015 | Bartfeld et al. |
| 9,043,151 | B2 | 5/2015 | Cai et al. |
| 9,286,629 | B2 | 3/2016 | Miller et al. |
| 9,449,151 | B2 | 9/2016 | Etchegoyen |
| 9,659,099 | B2 | 5/2017 | Miller et al. |
| 9,946,839 | B1 | 4/2018 | Wilson et al. |
| 10,041,803 | B2 | 8/2018 | Miller et al. |
| 10,078,855 | B2 | 9/2018 | Miller et al. |
| 10,210,270 | B2 | 2/2019 | Miller et al. |
| 10,275,810 | B2 | 4/2019 | Miller et al. |
| 10,282,797 | B2 | 5/2019 | Valverde, Jr. et al. |
| 10,311,068 | B2 | 6/2019 | Tanne et al. |
| 10,740,412 | B2 | 8/2020 | Bhat et al. |
| 11,049,047 | B2 | 6/2021 | Valverde, Jr. et al. |
| 2001/0044788 | A1 | 11/2001 | Demir et al. |
| 2002/0069133 | A1 | 6/2002 | Currie et al. |
| 2002/0082877 | A1 | 6/2002 | Scanlon et al. |
| 2002/0147619 | A1* | 10/2002 | Floss ...................... G06Q 30/02 705/5 |
| 2002/0173978 | A1 | 11/2002 | Boies et al. |
| 2002/0178034 | A1 | 11/2002 | Gardner et al. |
| 2003/0018499 | A1 | 1/2003 | Miller et al. |
| 2003/0023463 | A1 | 1/2003 | Dombroski et al. |
| 2003/0050846 | A1 | 3/2003 | Rodon |
| 2003/0055690 | A1 | 3/2003 | Garback |
| 2003/0055772 | A1 | 3/2003 | Goldstein |
| 2003/0135458 | A1 | 7/2003 | Tadano et al. |
| 2003/0177044 | A1 | 9/2003 | Sokel et al. |
| 2003/0217052 | A1 | 11/2003 | Rubenczyk et al. |
| 2004/0002876 | A1 | 1/2004 | Sommers et al. |
| 2004/0044516 | A1 | 3/2004 | Kennewick et al. |
| 2004/0078213 | A1 | 4/2004 | Brice et al. |
| 2004/0111255 | A1 | 6/2004 | Huerta et al. |
| 2004/0220854 | A1 | 11/2004 | Postrel |
| 2004/0249680 | A1 | 12/2004 | Liew et al. |
| 2005/0033614 | A1 | 2/2005 | Lettovsky et al. |
| 2005/0038644 | A1 | 2/2005 | Napper et al. |
| 2005/0043940 | A1 | 2/2005 | Elder |
| 2005/0108068 | A1 | 5/2005 | Marcken et al. |
| 2005/0144162 | A1 | 6/2005 | Liang |
| 2005/0220278 | A1 | 10/2005 | Zirngibl et al. |
| 2005/0267651 | A1 | 12/2005 | Arango et al. |
| 2005/0288973 | A1 | 12/2005 | Taylor et al. |
| 2006/0106655 | A1 | 5/2006 | Yong et al. |
| 2006/0178931 | A1 | 8/2006 | Horn |
| 2006/0241983 | A1 | 10/2006 | Viale et al. |
| 2006/0247954 | A1 | 11/2006 | Hunt |
| 2006/0265508 | A1 | 11/2006 | Angel et al. |
| 2006/0271277 | A1 | 11/2006 | Hu et al. |
| 2006/0285662 | A1 | 12/2006 | Mn et al. |
| 2006/0293930 | A1 | 12/2006 | Rodgers et al. |
| 2007/0073562 | A1 | 3/2007 | Brice et al. |
| 2007/0073563 | A1 | 3/2007 | Dourthe et al. |
| 2007/0100962 | A1 | 5/2007 | Barth et al. |
| 2007/0106497 | A1 | 5/2007 | Ramsey et al. |
| 2007/0106536 | A1 | 5/2007 | Moore |
| 2007/0143154 | A1 | 6/2007 | Ashby et al. |
| 2007/0156469 | A1 | 7/2007 | Bird et al. |
| 2007/0168245 | A1 | 7/2007 | De Marcken et al. |
| 2007/0168854 | A1 | 7/2007 | De Marcken et al. |
| 2007/0174350 | A1 | 7/2007 | Pell et al. |
| 2007/0185744 | A1 | 8/2007 | Robertson |
| 2007/0192186 | A1 | 8/2007 | Greene et al. |
| 2007/0198442 | A1 | 8/2007 | Horn |
| 2007/0203735 | A1 | 8/2007 | Ashton |
| 2007/0208503 | A1 | 9/2007 | Harnsberger |
| 2007/0260495 | A1 | 11/2007 | Mace et al. |
| 2007/0276595 | A1 | 11/2007 | Lewinson et al. |
| 2007/0294149 | A1 | 12/2007 | Lu et al. |
| 2008/0021748 | A1 | 1/2008 | Bay et al. |
| 2008/0046274 | A1 | 2/2008 | Geelen et al. |
| 2008/0052217 | A1 | 2/2008 | Etkin |
| 2008/0059454 | A1 | 3/2008 | Andrieu |
| 2008/0091525 | A1 | 4/2008 | Kretz |
| 2008/0091557 | A1 | 4/2008 | Cella et al. |
| 2008/0103949 | A1 | 5/2008 | Lobana et al. |
| 2008/0109232 | A1 | 5/2008 | Musgrove et al. |
| 2008/0114623 | A1 | 5/2008 | Berthaud et al. |
| 2008/0120306 | A1 | 5/2008 | Panabaker et al. |
| 2008/0201178 | A1 | 8/2008 | Vizitei |
| 2008/0262995 | A1 | 10/2008 | Zweig et al. |
| 2008/0319803 | A1 | 12/2008 | Heyraud et al. |
| 2009/0005650 | A1 | 1/2009 | Angell et al. |
| 2009/0006143 | A1 | 1/2009 | Orttung et al. |
| 2009/0048876 | A1 | 2/2009 | Bonissone et al. |
| 2009/0063359 | A1 | 3/2009 | Connors |
| 2009/0070322 | A1 | 3/2009 | Salvetti et al. |
| 2009/0112639 | A1 | 4/2009 | Robinson Beaver |
| 2009/0157312 | A1 | 6/2009 | Black et al. |
| 2009/0157664 | A1* | 6/2009 | Wen .................... G06Q 10/047 707/999.005 |
| 2009/0177651 | A1 | 7/2009 | Takamatsu et al. |
| 2009/0193352 | A1 | 7/2009 | Bunn |
| 2009/0210262 | A1 | 8/2009 | Rines et al. |
| 2009/0216633 | A1 | 8/2009 | Whitsett et al. |

(56) References Cited

U.S. PATENT DOCUMENTS

| | | | |
|---|---|---|---|
| 2009/0234681 A1 | 9/2009 | Champernowne | |
| 2009/0240517 A1* | 9/2009 | Pelter | G06Q 30/0278 705/306 |
| 2009/0313055 A1 | 12/2009 | Martin et al. | |
| 2009/0319305 A1 | 12/2009 | Weissert et al. | |
| 2009/0327148 A1 | 12/2009 | Kamar et al. | |
| 2010/0010841 A1 | 1/2010 | Weinberg et al. | |
| 2010/0010978 A1 | 1/2010 | Carapella et al. | |
| 2010/0030594 A1 | 2/2010 | Swart | |
| 2010/0082241 A1 | 4/2010 | Trivedi | |
| 2010/0153292 A1 | 6/2010 | Zheng et al. | |
| 2010/0217680 A1 | 8/2010 | Fusz et al. | |
| 2010/0217723 A1 | 8/2010 | Sauerwein, Jr. et al. | |
| 2010/0317420 A1 | 12/2010 | Hoffberg | |
| 2010/0318386 A1 | 12/2010 | Vaughan et al. | |
| 2010/0324927 A1 | 12/2010 | Tinsley | |
| 2011/0046989 A1 | 2/2011 | Crean et al. | |
| 2011/0093361 A1 | 4/2011 | Morales | |
| 2011/0125578 A1 | 5/2011 | Alspector et al. | |
| 2011/0137766 A1 | 6/2011 | Rasmussen et al. | |
| 2011/0153373 A1 | 6/2011 | Dantzig et al. | |
| 2011/0167003 A1 | 7/2011 | Nice et al. | |
| 2011/0231182 A1 | 9/2011 | Weider et al. | |
| 2011/0246246 A1 | 10/2011 | Johnson | |
| 2011/0295692 A1 | 12/2011 | Zivkovic et al. | |
| 2011/0307241 A1 | 12/2011 | Waibel et al. | |
| 2011/0307280 A1 | 12/2011 | Mandelbaum | |
| 2011/0312870 A1 | 12/2011 | Beatty | |
| 2012/0036158 A1 | 2/2012 | Cahill et al. | |
| 2012/0054001 A1 | 3/2012 | Zivkovic et al. | |
| 2012/0054054 A1 | 3/2012 | Kameyama | |
| 2012/0059679 A1 | 3/2012 | De Marcken et al. | |
| 2012/0089407 A1* | 4/2012 | Goldstein | G06Q 10/025 705/1.1 |
| 2012/0209517 A1 | 8/2012 | Li et al. | |
| 2012/0233207 A1 | 9/2012 | Mohajer | |
| 2012/0239440 A1* | 9/2012 | Miller | G06F 16/243 707/769 |
| 2012/0239443 A1 | 9/2012 | Miller et al. | |
| 2012/0239455 A1 | 9/2012 | Crean et al. | |
| 2012/0239584 A1 | 9/2012 | Yariv et al. | |
| 2012/0239669 A1 | 9/2012 | Miller et al. | |
| 2012/0259667 A1 | 10/2012 | Pelissier et al. | |
| 2012/0265598 A1 | 10/2012 | Krone | |
| 2012/0265696 A1 | 10/2012 | Tuchman et al. | |
| 2012/0330982 A1 | 12/2012 | Arnaud et al. | |
| 2013/0041696 A1 | 2/2013 | Richard | |
| 2013/0041902 A1 | 2/2013 | Swann et al. | |
| 2013/0054375 A1 | 2/2013 | Sy et al. | |
| 2013/0073323 A1 | 3/2013 | Zacharia et al. | |
| 2013/0073325 A1 | 3/2013 | Ross | |
| 2013/0090959 A1 | 4/2013 | Kvamme et al. | |
| 2013/0096965 A1 | 4/2013 | Pappas et al. | |
| 2013/0132129 A1 | 5/2013 | Fox et al. | |
| 2013/0144889 A1 | 6/2013 | Gupta et al. | |
| 2013/0151291 A1 | 6/2013 | Salway | |
| 2013/0158821 A1 | 6/2013 | Ricci | |
| 2013/0159023 A1 | 6/2013 | Srinivas et al. | |
| 2013/0166329 A1 | 6/2013 | Arnoux-Prost et al. | |
| 2013/0198036 A1 | 8/2013 | Pappas et al. | |
| 2013/0261957 A1 | 10/2013 | Mahapatro et al. | |
| 2013/0268532 A1 | 10/2013 | Doshi | |
| 2013/0304349 A1 | 11/2013 | Davidson | |
| 2013/0339105 A1 | 12/2013 | Russell et al. | |
| 2014/0012659 A1 | 1/2014 | Yan | |
| 2014/0019176 A1 | 1/2014 | Mandelbaum | |
| 2014/0025540 A1 | 1/2014 | Hendrickson | |
| 2014/0067483 A1 | 3/2014 | Jeong et al. | |
| 2014/0074746 A1 | 3/2014 | Wang | |
| 2014/0081793 A1 | 3/2014 | Hoffberg | |
| 2014/0089020 A1 | 3/2014 | Murphy | |
| 2014/0089036 A1 | 3/2014 | Chidlovskii | |
| 2014/0089101 A1 | 3/2014 | Meller | |
| 2014/0114705 A1 | 4/2014 | Bashvitz et al. | |
| 2014/0156411 A1 | 6/2014 | Murgai | |
| 2014/0229102 A1 | 8/2014 | Bapna et al. | |
| 2014/0257949 A1 | 9/2014 | Gishen | |
| 2014/0279196 A1 | 9/2014 | Wilson et al. | |
| 2014/0304014 A1 | 10/2014 | Lee et al. | |
| 2014/0330605 A1 | 11/2014 | Connolly et al. | |
| 2014/0330606 A1 | 11/2014 | Paget et al. | |
| 2014/0330621 A1 | 11/2014 | Nichols et al. | |
| 2014/0337063 A1 | 11/2014 | Nelson et al. | |
| 2015/0012309 A1 | 1/2015 | Buchheim et al. | |
| 2015/0012467 A1 | 1/2015 | Greystoke et al. | |
| 2015/0046201 A1 | 2/2015 | Miller et al. | |
| 2015/0066594 A1 | 3/2015 | Li et al. | |
| 2015/0066830 A1 | 3/2015 | Wilson et al. | |
| 2015/0149432 A1 | 5/2015 | Hart et al. | |
| 2015/0168169 A1 | 6/2015 | Caceres et al. | |
| 2015/0193583 A1 | 7/2015 | Mcnair et al. | |
| 2015/0227633 A1* | 8/2015 | Shapira | G06F 16/9038 707/706 |
| 2015/0235478 A1 | 8/2015 | Blandin et al. | |
| 2015/0242927 A1* | 8/2015 | Will | G06Q 30/0629 705/26.64 |
| 2015/0278970 A1 | 10/2015 | Valverde, Jr. et al. | |
| 2015/0339405 A1 | 11/2015 | Vora et al. | |
| 2015/0356262 A1 | 12/2015 | Liebovitz et al. | |
| 2016/0048928 A1 | 2/2016 | Davis et al. | |
| 2016/0055162 A1 | 2/2016 | Woolf | |
| 2016/0125559 A1 | 5/2016 | Shekou | |
| 2016/0132791 A1 | 5/2016 | Jin et al. | |
| 2016/0162871 A1 | 6/2016 | Lee | |
| 2016/0196271 A1 | 7/2016 | Miller et al. | |
| 2016/0202073 A1 | 7/2016 | Claycomb et al. | |
| 2016/0203422 A1 | 7/2016 | Demarchi et al. | |
| 2016/0232626 A1 | 8/2016 | Geraci et al. | |
| 2016/0258767 A1 | 9/2016 | Nevrekar et al. | |
| 2016/0275194 A1 | 9/2016 | Borza et al. | |
| 2016/0370197 A1 | 12/2016 | Miller et al. | |
| 2016/0371799 A1 | 12/2016 | Miller et al. | |
| 2017/0293722 A1 | 10/2017 | Valverde, Jr. et al. | |
| 2017/0316103 A1 | 11/2017 | Miller et al. | |
| 2018/0347995 A1 | 12/2018 | Valverde, Jr. et al. | |
| 2019/0012712 A1 | 1/2019 | Miller et al. | |
| 2019/0179863 A1 | 6/2019 | Miller et al. | |
| 2019/0243839 A1 | 8/2019 | Tanne et al. | |
| 2019/0251643 A1 | 8/2019 | Valverde, Jr. et al. | |
| 2020/0027039 A1 | 1/2020 | Miller et al. | |

FOREIGN PATENT DOCUMENTS

| | | |
|---|---|---|
| WO | 2009033167 A1 | 3/2009 |
| WO | 2012125742 A2 | 9/2012 |
| WO | 2012125753 A2 | 9/2012 |
| WO | 2012125761 A1 | 9/2012 |
| WO | 2015021180 A1 | 2/2015 |
| WO | 2015153776 A1 | 10/2015 |
| WO | 2016205076 A1 | 12/2016 |
| WO | 2016205280 A1 | 12/2016 |
| WO | 2017180483 A1 | 10/2017 |

OTHER PUBLICATIONS

Non-final Office Action and Notice of References Cited mailed Feb. 7, 2019 in U.S. Appl. No. 14/750,841 (18 pages).

Non-final Office Action and Notice of References Cited mailed Mar. 13, 2020 in U.S. Appl. No. 14/750,841 (25 pages).

Non-final Office Action and Notice of References Cited mailed Aug. 24, 2018 in U.S. Appl. No. 15/178,064 (30 pages).

Final Office Action and Notice of References Cited mailed Feb. 19, 2019 in U.S. Appl. No. 15/178,064 (33 pages).

Non-final Office Action and Notice of References Cited mailed Oct. 7, 2019 in U.S. Appl. No. 15/178,064 (44 pages).

Non-final Office Action and Notice of References Cited mailed Sep. 26, 2017 in U.S. Appl. No. 15/178,453 (12 pages).

Non-final Office Action and Notice of References Cited mailed Sep. 16, 2019 in U.S. Appl. No. 16/055,767 (7 pages).

Final Office Action and Notice of References Cited mailed Apr. 18, 2017 in U.S. Appl. No. 14/453,420 (27 pages).

(56) References Cited

OTHER PUBLICATIONS

Non-final Office Action mailed Mar. 9, 2018 in U.S. Appl. No. 14/453,420 (38 pages).
Final Office Action and Notice of References Cited mailed Aug. 27, 2018 in U.S. Appl. No. 14/453,420 (45 pages).
Non-final Office Action and Notice of References Cited mailed Jan. 7, 2019 in U.S. Appl. No. 14/453,420 (47 pages).
Final Office Action and Notice of References Cited mailed Mar. 29, 2019 in U.S. Appl. No. 14/453,420 (44 pages).
Non-final Office Action and Notice of References Cited mailed Jul. 12, 2018 in U.S. Appl. No. 15/183,620 (14 pages).
Non-Final Office Action and Notice of References Cited mailed Nov. 29, 2018 in U.S. Appl. No. 15/183,620 (17 pages).
Non-final Office Action and Notice of References Cited mailed May 22, 2019 in U.S. Appl. No. 15/183,620 (16 pages).
Non-final Office Action and Notice of References Cited mailed Apr. 17, 2019 in U.S. Appl. No. 15/482,619 (42 pages).
Non-final Office Action and Notice of References Cited mailed Apr. 14, 2020 in U.S. Appl. No. 15/979,275 (14 pages).
Non-final Office Action and Notice of References Cited mailed May 28, 2020 in U.S. Appl. No. 16/142,834 (33 pages).
Final Office Action and Notice of References Cited mailed Oct. 23, 2020 in U.S. Appl. No. 14/750,841 (21 pages).
Notices of Allowance and References Cited issued Mar. 16, 2021 in U.S. Appl. No. 14/750,841 (12 pages).
PR Newswire, "GetGoing Launches Multi-Supplier Hotel Merchandising Platform: BCD Travel Signs Multi-Year Agreement to Streamline Hotel Booking for Travel Management Companies", New York, PR Newswire Association LLC, Sep. 23, 2014 (2-3 pages).
Notices of Allowance and References Cited mailed Jul. 9, 2021 in U.S. Appl. No. 16/275,133 (12 pages).
Notices of Allowance and Cited References mailed Oct. 29, 2021 in U.S. Appl. No. 16/854,753 (10 pages).
Niknafs, et. al., A Case-Based Reasoning Approach in E-tourism: Tour Itinerary Planning, Proceedings of the 14th International Workshop on Database and Expert Systems Applications (DEXA'03), 2003 (Year: 2003) (5 pages).
Final Office Action and Notice of References Cited mailed Dec. 5, 2022 in U.S. Appl. No. 16/396,487 (10 pages).
Notices of Allowance and Cited References mailed Feb. 23, 2023 in U.S. Appl. No. 17/502,625 (8 pages).
Non-final Office Action and Notice of References Cited mailed Apr. 24, 2023 in U.S. Appl. No. 17/106,022 (17 pages).
Notice of Allowance and References cited mailed May 5, 2023 in U.S. Appl. No. 16/396,487 (13 pages).
Supplemental Notice of Allowance mailed May 15, 2023 in U.S. Appl. No. 16/396,487 (8 pages).
Rudnicky, et al., "An Agenda-Based Dialog Management Architecture for Spoken Language Systems," IEEE Automatic Speech Recognition and Understanding Workshop, vol. 13, No. 4, 1999.
International Search Report and Written Opinion mailed Jun. 15, 2012 in International Patent Application No. PCT/US2012/029121 (8 pages).
International Search Report and Written Opinion mailed Jun. 7, 2012 in International Patent Application No. PCT/US2012/029098 (6 pages).
International Search Report and Written Opinion mailed Mar. 14, 2013 in International Patent Application No. PCT/US2012/029112 (6 pages).
International Search Report and Written Opinion mailed Nov. 24, 2014 in International Patent Application No. PCT/US2014/049979 (8 pages).
United Hub, "FareLock: An Opportunity to Lock in Your Ticket Price for up to Seven Days", Jul. 28, 2012 <https://web.archive.org/web/20120728071904/https://www.united.com/CMS/en-US/products/travelproducts/Pages/FareLock.aspx>, Aug. 17, 2012 <https://hub.united.com/en-us/news/products-services/pages/farelock-lets-you-lock-in-your-ticket-price.aspx> (3 pages).
Mackenzie, "Two Services Help You Lock in a Good Deal on Airfare", Hack My Trip, Apr. 2014 <http://hackmytrip.com/2014/04/two-services-help-lock-good-deal-airfare> (9 pages).
Boardman, "Options Away", Vimeo, May 24, 2013 <http://vimeo.com/66936261> (2 pages).
International Search Report and Written Opinion mailed Jul. 2, 2015 in International Patent Application No. PCT/US2015/023901 (8 pages).
Examiner's Report issued Feb. 26, 2016 in CA Patent Application No. 2,830,228 (3 pages).
Examiner's Report issued May 18, 2016 in CA Patent Application No. 2,830,224 (6 pages).
Examiner's Report issued May 19, 2016 in CA Patent Application No. 2,830,229 (4 pages).
International Search Report and Written Opinion mailed Jul. 11, 2016 in International Patent Application No. PCT/US2016/037555 (12 pages).
International Search Report and Written Opinion mailed Sep. 1, 2016 in International Patent Application No. PCT/US2016/036760 (8 pages).
International Search Report and Written Opinion mailed Sep. 9, 2016 in International Patent Application No. PCT/US2016/037503 (6 pages).
International Search Report and Written Opinion mailed Sep. 27, 2016 in International Patent Application No. PCT/US2016/036749 (8 pages).
Notice of Allowance issued Jan. 12, 2017 in CA Patent Application No. 2,830,228 (1 page).
Notice of Allowance issued May 4, 2017 in CA Patent Application No. 2,830,224 (1 page).
Examiner's Report issued Apr. 28, 2017 in CA Patent Application No. 2,830,229 (4 pages).
International Search Report and Written Opinion mailed Jul. 7, 2017 in International Patent Application No. PCT/US2017/026708 (8 pages).
Mayerowitz, "Latest Airline Fee: $9 to Lock in Airfare", ABC News [online], Dec. 13, 2010 <http://web.archive.org/web/20110122133909/http://abcnews.go.com/Travel/airline-fees-forget-checked-bags-pay-lock-airfare/story?id=12385126> (p. 1) and Dec. 18, 2010 <http://web.archive.org/web/20101218074131/http://abcnews.go.com:80/Travel/airline-fees-forget-checked-bags-pay-lock-airfare/story?id=12385126&page=2 (p. 2), total 8 pages.
Examiner's Report issued Mar. 16, 2018 in CA Patent Application No. 2,830,229 (5 pages).
Goddeau, et al., "Galaxy: A Human-Language Interface to On-Line Travel Information", 3rd International Conference on Spoken Language Processing (ICSLP94), Yokohama, Japan, Sep. 18-22, 1994, pp. 707-710.
Subramoni, "Topology-Aware MPI Communication and Scheduling for High Performance Computing Systems", Ohio State University, 2013, 151 pages.
Tablan et al., "A Natural Language Query Interface to Structured Information", The Semantic Web: Research and Applications, ESWC 2008: Lecture Notes in Computer Science, vol. 5021, pp. 361-375.
United Airlines, "FareLock", webpage, Jul. 28, 2012 <https://www.united.com/CMS/en-US/products/travel/products/Pages/FareLock.aspx> (4 pages).
Federal Trade Commission, "Using Layaway Plans", webpage, Dec. 19, 2012 <http:/web.archive.org/web/20121219044435/https://www.consumer.ftc.gov/articles/0128-using-layaway-plans> (2 pages).
Examiner's Report issued Feb. 27, 2019 in CA Patent Application No. 2,944,652 (5 pages).
Examiner's Report issued Mar. 1, 2019 in CA Patent Application No. 2,830,229 (3 pages).
Examiner's Report issued Jun. 3, 2019 in CA Patent Application No. 3,021,147 (5 pages).
Examiner's Report issued Jul. 26, 2019 in CA Patent Application No. 2,989,325 (6 pages).
Examiner's Report issued Dec. 30, 2019 in CA Patent Application No. 2,944,652 (5 pages).
Non-final Office Action and Notice of References Cited mailed Jun. 5, 2018 in U.S. Appl. No. 15/595,795 (14 pages).

(56) References Cited

OTHER PUBLICATIONS

Non-final Office Action and Notice of References Cited mailed Mar. 11, 2015 in U.S. Appl. No. 13/420,433 (9 pages).
Non-final Office Action and Notice of References Cited mailed Feb. 26, 2016 in U.S. Appl. No. 13/420,433 (11 pages).
Non-final Office Action and Notice of References Cited mailed Dec. 16, 2013 in U.S. Appl. No. 13/419,989 (16 pages).
Non-final Office Action and Notice of References Cited mailed Dec. 5, 2014 in U.S. Appl. No. 13/419,989 (14 pages).
Notices of Allowance and References Cited mailed Dec. 18, 2015 in U.S. Appl. No. 13/419,989 (15 pages).
Non-final Office Action and Notice of References Cited mailed Oct. 21, 2014 in U.S. Appl. No. 13/420,179 (10 pages).
Non-final Office Action and Notice of References Cited mailed Aug. 12, 2015 in U.S. Appl. No. 14/750,841 (15 pages).
Non-final Office Action and Notice of References Cited mailed Aug. 14, 2015 in U.S. Appl. No. 14/676,302 (19 pages).
Final Office Action and Notice of References Cited mailed Apr. 6, 2016 in U.S. Appl. No. 14/676,302 (26 pages).
Final Office Action and Notice of References Cited mailed Jul. 11, 2016 in U.S. Appl. No. 13/420,433 (12 pages).
Non-final Office Action and Notice of References Cited mailed Sep. 20, 2016 in U.S. Appl. No. 14/453,420 (29 pages).
Non-final Office Action and Notice of References Cited mailed Nov. 30, 2016 in U.S. Appl. No. 14/676,302 (20 pages).
Non-final Office Action and Notice of References Cited mailed Dec. 29, 2016 in U.S. Appl. No. 14/750,841 (16 pages).
Non-final Office Action and Notice of References Cited mailed Jul. 13, 2016 in U.S. Appl. No. 15/069,791 (12 pages).
Non-final Office Action and Notice of References Cited mailed Jun. 22, 2016 in U.S. Appl. No. 13/420,179 (13 pages).
Notices of Allowance and References Cited mailed Dec. 27, 2018 in U.S. Appl. No. 13/420,179 (13 pages).
Non-final Office Action and Notice of References Cited mailed Apr. 24, 2018 in U.S. Appl. No. 14/676,302 (26 pages).
Advisory Action mailed May 21, 2015 in U.S. Appl. No. 13/420,179 (3 pages).

* cited by examiner

800

812 814

| | | | | | |
|---|---|---|---|---|---|
| A: Ground Transportation to Airport 802 | a1: Subway (0.3, $4.50) | a2: Uber (Regular) (0.6, $30) | a3: Taxi (0.45, $37) | a4: Uber (Black) (0.9, $47) | |
| B: Outbound Itinerary 804 | b1: Cheapest (2 stops) (0.2, $299) | b2: Economy (1 stop) (0.45, $450) | b3: Economy (non-stop) (0.6, $535) | b4: Economy+ (non-stop) (0.7, $600) | b5: Business Class (non-stop) (0.95, $800) |
| C: Ground Transportation at Destination 806 | c1: Taxi (0.3, $300) | c2: Uber (0.6, $280) | c3: Rental Car (0.75, $375) | | |
| D: Hotel Accomodation 806 | d1: 3-Star-Chain (0.3, $350) | d2: 4-Star-Chain (0.6, $475) | d3: 4-Star-Chain (0.55, $425) | d4: 4-Star Boutique (0.9, $550) | |
| E: Return Itinerary 808 | e1: Cheapest (2 stops) (0.1, $299) | e2: Economy (1 stop) (0.65, $450) | e3: Economy (non-stop) (0.7, $535) | e4: Economy+ (non-stop) (0.8, $600) | e5: Business Class (non-stop) (0.95, $800) |
| F: Ground Transportation to Home 810 | f1: Subway (0.2, $4.50) | f2: Uber (Regular) (0.65, $30) | f3: Taxi (0.3, $37) | f4: Uber (Black) (0.9, $47) | |

FIG. 8

TRAVEL BOOKING PLATFORM WITH MULTIATTRIBUTE PORTFOLIO EVALUATION

CROSS-REFERENCE TO RELATED APPLICATIONS

The present utility patent application is related to and a continuation of U.S. patent application Ser. No. 17/106,022 filed Nov. 27, 2020, which is a continuation-in-part of U.S. patent application Ser. No. 14/750,841 filed Jun. 25, 2015, and U.S. patent application Ser. No. 16/142,834 filed Sep. 26, 2018, which claims the priority benefit under 35 U.S.C. 119(e) of U.S. Provisional Application No. 62/574,533, filed on Oct. 19, 2017, and titled "ITINERARY PORTFOLIO EVALUATION TOOL." The disclosure of these related non-provisional and provisional applications is incorporated herein by reference for all purposes to the extent that such subject matter is not inconsistent herewith or limiting hereof.

TECHNICAL FIELD

The present disclosure relates to data processing and, more particularly, to facilitating travel planning.

BACKGROUND

Travel consumers enjoy of a plurality of options. The travel market is replete with numerous sources providing travel-related information and advice on everything from destinations to hotels, related points of interest, and pricing data for a vast array of goods and services. While consumers can derive much utility from this choice environment enabled by online travel agencies (OTAs) and travel websites, a choice task of the travel consumer is often encumbered by information abundance and by legacy technology platforms that almost invariably complicate the consumer choice problem.

For the average consumer, these choice-related challenges can take many forms, which include a large number of viable itinerary options to sort through, evaluate, and ultimately choose from; disparate and non-homogenous information sources, all of which possess varying degrees of quality, usefulness, and reliability; and the need to consider complex value trade-offs among key choice attributes and objectives (e.g., price vs. suitability of a selected flight for the consumer), together with the existence of often conflicting objectives (e.g., a desire for luxury, constrained by willingness-to-pay).

To overcome the choice-related challenges, average consumers typically utilize a vast array of short-cuts and heuristics, all of which enable the consumer to sift through and evaluate numerous choice options, in ways that lead, ultimately, to choices that satisfy the consumer. This piecemeal, serial manner in which consumers typically construct, evaluate, and ultimately purchase travel itineraries (e.g., first, airfare options are reviewed and selections are made; this selection is followed, in turn, by the identification and evaluation of hotel options, and so on) can lead to undesirable allocative inefficiencies that stem from a kind of evaluative and decisional myopia that ultimately compromises the ability of the consumer to construe itinerary value holistically. In other words, delivering travel booking capabilities to the consumer needs to be redesigned to maximize the expected utility of individual consumers seeking to make travel-related purchases. Moreover, consumers need to be able to identify option combinations that create maximal overall utility or value, across the entire spectrum of available options, subject to any constraints deemed relevant to the itinerary construction, evaluation, and selection task.

SUMMARY

Various embodiments of a travel booking platform with multiattribute portfolio evaluation as a system and methods of use thereof are provided according to the teachings herein.

According to one aspect of the invention, there is disclosed a system for facilitating travel reservations, the system comprising: a database in communication with a processor, the database having stored thereon: a travel lexicon having attribute names and related values for flights, hotels, origins, and destinations; and a travel taxonomy comprising look-up tables having logical relations and predicates; a scheduler in communication with the processor and operable to: instantiate the plurality of travel attributes in terms of the travel lexicon that are relevant to a travel-related query, thereby generating a plurality of instantiated travel attributes; index the plurality of instantiated travel attributes, thereby generating an attribute index comprising a plurality of indexed travel attributes defined in terms of the travel lexicon; search for feasible travel itineraries based on the plurality of indexed travel attributes, the feasible travel itineraries determined based on at least two weighted attributes and user preferences; and transmit the feasible travel itineraries including an optimal travel itinerary and feasibility scores to a user device to present, to the user via the user device; a parser in communication with the processor and operable to: parse the travel-related query to derive a vector function comprising at least two attribute values related to the plurality of indexed travel attributes, and to derive at least one constraint related to the travel-related query; and ascertain a relevant attribute set for the travel-related query, the relevant attribute set comprising the at least two attribute values for the travel-related query selected from the plurality of travel attributes based on a context of the travel-related query in the travel taxonomy; the processor in communication with the database, the scheduler, and the parser, the processor operable to: receive the travel-related query from the user via the user device, the travel-related query comprising free text data obtained via at least one of a natural language oral exchange or a natural language typed text; receive the user preferences for the user from at least one of the database, the user device, or a server, the user preferences including relative importances assigned to each of the plurality of travel attributes; rank the at least two attribute values related to the relevant attribute set based on encoded preference information derived from the user preferences, thereby generating a ranking that represents a relative importance of each attribute value related to the relevant attribute set; assign weights to each of the at least two attribute values based on the ranking to create the at least two weighted attributes for the relevant attribute set; associate a value to each of the feasible travel itineraries based on the at least two weighted attributes and a value score corresponding to a performance of the feasible travel itinerary under each of the at least two travel attributes, thereby generating rank-order preference data for preference information that is associated with the travel-related query; score the feasible travel itineraries based at least in part on the at least two weighted attributes for each of the feasible travel itineraries and associated rank-order preference data to create the feasibility scores; and select, from the feasible travel itineraries, based on the at least one constraint, the optimal travel itinerary to be provided to the user.

In at least one embodiment, the user preferences are determined based on one or more of the following: the travel-related query, preexisting selections of the user and preexisting selections of one or more further users.

In at least one embodiment, the system comprises a man-machine interface to receive the preexisting selections from the user.

In at least one embodiment, the travel related query is for a plurality of users.

In at least one embodiment, the processor is configured to adjust the scoring of the feasible travel itineraries based on forecasted weather conditions at a time of travel.

In at least one embodiment, the presenting of the at least one travel itinerary is performed within a predetermined time after the receiving of the travel related query.

In at least one embodiment, the processor is configured to visualize the at least one travel itinerary and corresponding scores.

In at least one embodiment, the travel-related query is provided via at least one of the following: a natural language, a typed text, and a selection of preexisting options.

In at least one embodiment, the selecting of the optimal travel itinerary from the feasible travel itineraries is based on the scoring of the feasible travel itineraries.

In at least one embodiment, the at least one constraint includes one or more of the following: a budgetary constraint, a logical constraint, a conditional constraint, and a timing constraint.

In at least one embodiment, the processor is configured to identify at least one of the feasible travel itineraries for which a budget allocation is unutilized, the budget allocation being associated with the at least one constraint.

In at least one embodiment, the processor is configured to present at least the optimal travel itinerary and the at least one of the feasible travel itineraries for which the budget allocation is unutilized to the user.

In at least one embodiment, the database has stored thereon the user preferences for the user related to the plurality of travel attributes.

In at least one embodiment, the parser is operable to parse the travel-related query to determine the user preferences based on an understanding of an intent of the user related to the travel-related query.

In at least one embodiment, the processor is operable to associate cost data with at least one of the at least two weighted attributes and the processor is operable to score the feasible travel itineraries based at least in part on the cost data associated with at least one of the at least two weighted attributes.

According to another aspect of the invention, there is disclosed a method for facilitating travel reservations by a computer processor in communication with a database having stored thereon (a) a travel lexicon having attribute names and related attribute values for flights, hotels, origins, and destinations, and (b) a travel taxonomy comprising look-up tables having logical relations and predicates, the method comprising: receiving a travel-related query from the user via a user device, the travel-related query comprising free text data obtained via at least one of a natural language oral exchange or a natural language typed text; instantiating the plurality of travel attributes in terms of the travel lexicon that are relevant to the travel-related query, thereby generating a plurality of instantiated travel attributes; indexing the plurality of instantiated travel attributes, thereby generating an attribute index comprising a plurality of indexed travel attributes defined in terms of the travel lexicon; parsing the travel-related query to derive at least one constraint related to the travel-related query and to derive a vector function comprising at least two attribute values related to the plurality of indexed travel attributes comprised in the attribute index; ascertaining a relevant attribute set for the travel-related query, the relevant attribute set comprising at least two attribute values for the travel-related query selected from the plurality of travel attributes based on a context of the travel-related query in a travel taxonomy; receiving user preferences for the user from at least one of the database, the user device, or a server, the user preferences including relative importances assigned to each of the plurality of travel attributes; ranking the at least two attribute values related to the relevant attribute set based on encoded preference information derived from the user preferences, thereby generating a ranking that represents a relative importance of each attribute in the relevant attribute set; assigning weights to each of the at least two attribute values based on the ranking to create at least two weighted attributes for the relevant attribute set; searching for feasible travel itineraries based on the plurality of indexed travel attributes, the feasible travel itineraries determined based on the at least two weighted attributes and the user preferences; associating a value to each of the feasible travel itineraries based on the at least two weighted attributes and a value score corresponding to a performance of the feasible travel itinerary under each of the at least two travel attributes, thereby generating rank-order preference data for preference information that is associated with the travel-related query; scoring the feasible travel itineraries based at least in part on the at least two weighted attributes for each of the feasible travel itineraries and associated rank-order preference data to create the feasibility scores; selecting from the feasible travel itineraries, based on the at least one constraint, an optimal travel itinerary to be provided to the user; and transmitting the feasible travel itineraries including the optimal travel itinerary and the feasibility scores to the user device to present, to the user via the user device.

In at least one embodiment, the user preferences are determined based on one or more of the following: the travel-related query, preexisting selections of the user and preexisting selections of one or more further users.

In at least one embodiment, the travel related query is for a plurality of users.

In at least one embodiment, the method comprises adjusting the scoring of the feasible travel itineraries based on forecasted weather conditions at a time of travel.

In at least one embodiment, the presenting of the at least one travel itinerary is performed within a predetermined time after the receiving of the travel related query.

In at least one embodiment, the method comprises visualizing the at least one travel itinerary and corresponding scores.

In at least one embodiment, the at least one attribute having at least one of the derived attribute values is a necessarily satisfied condition.

In at least one embodiment, the method comprises providing a man-machine interface to receive the preexisting selections from the user.

In at least one embodiment, the at least one constraint includes one or more of the following: a budgetary constraint, a logical constraint, a conditional constraint, and a timing constraint.

In at least one embodiment, the selecting of the optimal travel itinerary from the feasible travel itineraries is based on the scoring of the feasible travel itineraries.

In at least one embodiment, the method comprises identifying at least one of the feasible travel itineraries for which a budget allocation is unutilized, the budget allocation being associated with the at least one constraint.

In at least one embodiment, the method comprises presenting at least the optimal travel itinerary and the at least one of the feasible travel itineraries for which the budget allocation is unutilized to the user.

In at least one embodiment, the travel-related query is provided via at least one of the following: a natural language, a typed text, and a selection of preexisting options.

In at least one embodiment, the database has stored thereon the user preferences for the user related to the plurality of travel attributes.

In at least one embodiment, parsing the travel-related query comprises determining the user preferences based on an understanding of an intent of the user related to the travel-related query.

In at least one embodiment, the method comprises associating cost data with at least one of the at least two weighted attributes and scoring the feasible travel itineraries is based at least in part on the cost data associated with at least one of the at least two weighted attributes Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

Embodiments are illustrated by way of example and not limitation in the figures of the accompanying drawings, in which like references indicate similar elements.

FIG. 8 illustrates a representation of an itinerary portfolio structure, according to an example embodiment.

DETAILED DESCRIPTION

Figure 1:
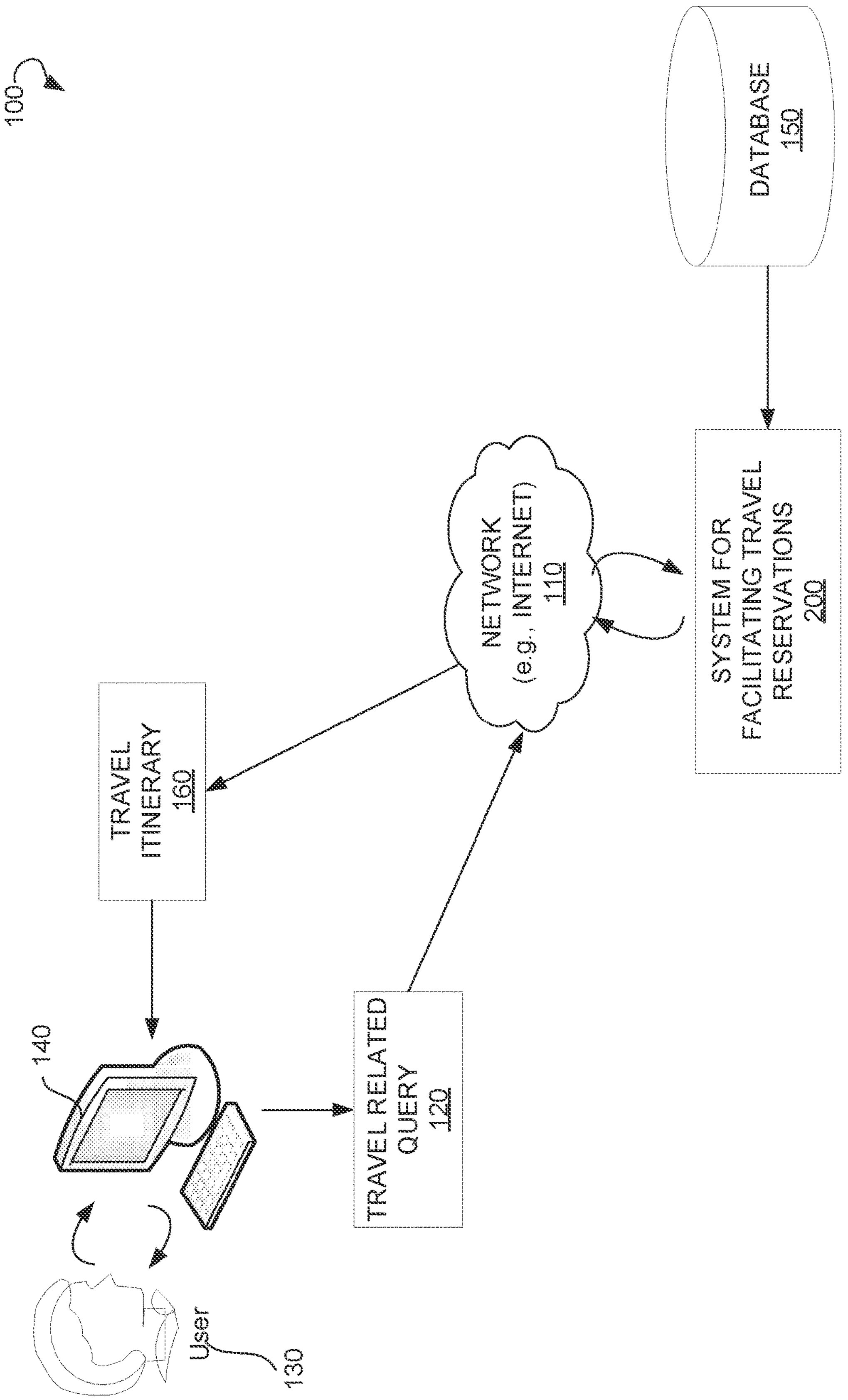
FIG. 1 illustrates an environment within which systems and methods for facilitating travel reservations can be implemented.

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

The system may act as a decision framework that provides a structural basis for travel itinerary planning and is capable of supporting the evaluative challenges entailed in identifying the itinerary option combinations that maximize or enhance overall itinerary value for the consumer. Moreover, the system provides an analytic decision frame that brings a holistic orientation to how problems of allocative efficiency are approached within the context of the itinerary choice task.

The disclosure relates to a system for facilitating optimization-based travel itinerary planning to aid consumer efforts directed at constructing value- or utility-maximizing travel itineraries, given some understanding of goals, objectives, and preferences of a consumer, together with an understanding of any constraints, such as budgetary, logical, timing, or other constraints. More specifically, the system brings a portfolio-analytic frame to an itinerary choice task of the travel consumer. The purpose of the system is to identify Pareto efficient itinerary options that maximize overall itinerary value for the consumer and are consistent with specified constraints. By making the travel planning process more efficient, the likelihood of consumer ex post purchase satisfaction may increase because of enhanced decision quality provided to the consumer.

In the present disclosure, upon receiving a travel related query from the consumer, the platform may analyze the travel related query to determine multiple attributes and constraints relating to itinerary options of the consumer. The attributes may include itinerary elements, such as airlines, hotel options, dates, and so forth. The constraints may include budgetary constraints, timing constraints, logical constraints, and so forth. The attributes may have differing levels of importance for the consumer. Therefore, the platform may prioritize and rank the attributes based on consumer preferences. Based on the ranking, each of the attributes may be assigned a weight depending on an importance of this attribute for the consumer. Furthermore, the platform may associate each of the weighted attributes with cost data related to each of the weighted attributes. The platform may perform a search based on the attributes and the consumer preferences to assemble feasible travel itineraries. The platform may perform multiparameter scoring of feasible travel itineraries. Specifically, the feasible travel itineraries may be simultaneously scored based on the weighted attributes and the cost data associated with the weighted attributes. The travel itineraries having the highest scores may be presented to the consumer in response to the travel-related query. Further, at least one optimal travel itinerary may be selected from the feasible travel itineraries based on the constraints associated with the travel-related query. The selected optimal travel itinerary may be presented to the user.

A plurality of feasible travel itineraries is also referred to herein as an itinerary portfolio group. The itinerary portfolio group may be structured hierarchically in terms of one or more itinerary categories or groups, i.e., attributes related to the travel-related query. The itinerary portfolio group can describe typical itinerary elements of the itinerary, such as flights, hotel options, and the like, as well as other attributes, such as ground transportation options, tours, and so forth. Each itinerary portfolio group may contain a constructed choice set of determinate size, and each choice set may consist of options that pertain to the itinerary portfolio group to which the choice set belongs.

While determining multiple attributes relevant to the travel related query, the platform may create a linkage between (i) natural language instantiation of itinerary-relevant attributes via parsing the travel related query; and (ii) consumer-specified preference information concerning relevant travel goods and services (e.g., airlines and hotels), which, for example, can be ascertained from a consumer account associated with the platform.

Firstly, the platform is both intention- and preference-driven. The platform is developed at the very foundations of travel planning actions and travel-related consumption. The platform can therefore be capable of "understanding" travel-related requests in terms of the determinate goals and objectives of consumers, as well as include the ability to properly handle the logistics of travel. To the extent that it is possible for the platform to either "know" or infer the travel-related preferences of the consumer, the preferences may factor into how travel requests are ultimately serviced within the platform.

Secondly, a man-machine interface of the platform can enable specifying travel-related goals and objectives. For this purpose, the platform may use parsing of natural language of the travel related queries. Accordingly, the platform can enable the consumer to articulate/specify strategic intent via natural language queries, with the built-in intelligence to understand a robust travel lexicon.

Thirdly, the platform can be capable of supporting the complex logistics and scheduling of multi-passenger/multi-leg/multi-city itineraries. Existing OTA technologies are incapable of efficiently handling complex itinerary requests, involving multiple, perhaps geographically-distributed, travelers. In contrast, the platform may incorporate complex scheduling capabilities, enabling groups of travelers (e.g., business colleagues or families) to effectively plan and book travel.

Fourthly, the platform can possess true end-to-end integration, including fulfillment. A characteristic feature of many travel applications and web sites is the ability to move from search/research to booking/purchase within the application. The platform may have en suite capabilities that never require the consumer to exit the travel application environment prior to making a purchase decision, thereby providing the consumer with an immersive "all-in-one" experience from making a travel related query to purchasing tickets for travel.

Furthermore, interactivity and control can be built into the platform, and the consumer may be able to personalize aspects of the interactivity. The consumer can be able to define aspects of how the consumer interacts with and consumes travel content. The platform may therefore be capable of receiving requests of the consumer (in fact, capable of "listening" to the consumer), with the goal of finding satisfying solutions to articulated/stated goals and objectives, consistent with underlying preferences and consumer willingness-to-pay. Moreover, the platform may enable the consumer to amend/revise plans during searching for a requisite purchase decision.

Moreover, the platform may possess both stage and state awareness. More specifically, the platform may be operable to determine where the consumer is in the path-to-purchase. With this awareness, the platform may come to determining of information requirements and needs of the consumer.

Additionally, the platform may possess a purpose-built choice architecture that may provide the consumer with decision aiding capabilities. The goal is to provide the consumer with the most efficient route to a requisite or satisfying purchase decision.

Furthermore, the platform may incorporate journey management capabilities to enable the consumer to change elements of a travel itinerary. It is often the case that changes must be made to one or more aspects of a purchased travel itinerary—driven, for example, by endogenous reasons (e.g., the change of travel plans of the consumer) or by exogenous factors (e.g., extreme weather).

Additionally, the platform may be consumer-centric in both the design of the platform and how the platform acts in the marketplace, thereby maximizing the efficiency of the travel-buying experience. The goal of the platform is to deliver maximal personal utility to the travel consumer; the platform is therefore "utility-centric," as opposed to profit-centric.

Many of the core design elements and principles of the platform outlined above relate directly to how feasible travel requests can be identified and presented for consideration to the consumer. In this regard, the platform may tend to explore the manner in which choice is manifested within the platform. The more travel itinerary options that are presented to the consumer, the greater the chance that the consumer finds a travel itinerary that aligns with preferences of the consumer. Therefore, there is a tension between abundance of choice and choice burden for the consumer. At the same time, the presence of a plurality of options places a greater cognitive burden on the consumer, and this can lead to compromised decision quality and possibly sub-optimal outcomes. The cognitive burden may lie upon the consumer or a representative of the consumer, e.g., a travel agent creating a travel itinerary for a consumer. The platform may provide the balance between "richness of options" and "choice overload," along with considering conflicting objectives and values (e.g., a desire for luxury constrained by willingness-to-pay).

The platform addresses, among others, the technical problem that user queries may be about anything, and not constrained within the travel domain. A related problem is on the search side: the many possible attributes of this open domain search need to be compressed to facilitate an efficient retrieval of relevant content within the target travel domain.

Thus, the platform has a choice architecture that pertains to how the choice task is structured, and how choice options are described or presented to the consumer. The choice architecture can be characterized by the following categories:

Logical/Rational Basis. The knowledge, information, and preferences that factor into the travel itinerary selection process can be structured and evaluated in a transparent and rationally consistent manner. The logical basis may formally include multiple attributes in order to allow for proper trade-off analysis.

Speed and Efficiency. The choice architecture can provide results and itinerary solutions within time-frames that are compatible with the OTA decision context (i.e., on the order of a few seconds). Information and analysis can be presented to the consumer in an efficient manner, minimizing search costs and conveying essential information in ways that enable rapid identification of minimal choice sets, from which final purchase decisions can be made.

Awareness of Cognitive Biases and Heuristics. Consumers are known to invoke a number of heuristics and biases in evaluating travel options. For example, consumers can often perform an initial screening of options on the basis of some subset of total product attributes (e.g., cost), and then make alternative-based comparisons on the basis of the remaining attributes after the initial screening. Within the travel space, it is also not uncommon to see consumers use attribute information (e.g., seat choice) to predict their en route or ex post satisfaction. The choice task for the average travel consumer can be, in fact, replete with cognitive biases. As consumers are often inclined to accept and use information in the form in which they receive it, the choice architecture of the platform may present information to the consumer in ways that minimize the adverse effects of cognitive biases that can adversely impact decision quality and consumer satisfaction.

Visualization Capabilities. It is important for consumers to be able to visualize the results of their travel queries in ways that ultimately maximize decisional efficiency. At a minimum, the visualization schemes may, when presenting two or more travel itinerary options, convey rank information as well as information concerning the cause of the rank. The platform is able to convey information about "performance" (namely, suitability of the travel itinerary based on customer preferences) vs. price by conveying maximal information to the consumer in an efficient and easy-to-understand manner. The interactive refinement and/or modification of travel search attributes is also a part of the decision aiding capabilities of the platform.

FIG. 1 illustrates an environment 100 within which the systems and methods for facilitating optimization-based travel itinerary planning can be implemented, in accordance with some embodiments. A travel related query 120 associated with a user 130 may be received, for example, via a user interface displayed on a user device 140. The travel related query 120 may include free text data. The free text data may be obtained as a natural language input by the user 130, by speech-to-text conversion of an oral exchange with the user 130, or otherwise. In some embodiments, the user 130 may be asked, in oral or written form, one or more motivating questions to receive relevant travel related query 120.

The travel related query 120 may be transmitted to the system 200 for facilitating travel reservations via a network 110. The network 110 may include the Internet or any other network capable of communicating data between devices. Suitable networks may include or interface with any one or more of, for instance, a local intranet, a Personal Area Network (PAN), a Local Area Network (LAN), a Wide Area Network (WAN), a Metropolitan Area Network (MAN), a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or an Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System (GPS), cellular digital packet data, Research in Motion, Limited duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a Universal Serial Bus (USB) connection or other wired or wireless, digital or analog interface or connection, mesh or Digi® networking. The network 110 may be a network of data processing nodes that are interconnected for the purpose of data communication. The network 110 may include any suitable number and type of devices (e.g., routers and switches) for forwarding commands, content, and/or web object requests from each client to the online community application and responses back to the clients.

The user device 140, in some example embodiments, may include a Graphical User Interface (GUI) for displaying the user interface associated with the system 200. In a typical GUI, instead of offering only text menus or requiring typed commands, the system 200 may present graphical icons, visual indicators, or special graphical elements called widgets that may be utilized to allow the user 130 to interact with the system 200. The user device 140 may be configured to utilize icons used in conjunction with text, labels, or text navigation to fully represent the information and actions available to the user 130.

The user device 140 may include a mobile telephone, a personal computer (PC), a laptop, a smart phone, a tablet PC, and so forth. The system 200 may be a server-based distributed application; thus it may include a central component residing on a server and one or more client applications residing on one or more user devices and communicating with the central component via the network 110. The user 130 may communicate with the system 200 via a client application available through the user device 140.

Travel itineraries available from the optional database 150 may be analyzed with reference to preferences of the user 130 and travel itineraries 160 suiting the preferences of the user 130 may be determined. Travel itineraries 160 may be presented to the user 130 by displaying travel itineraries 160 via the user interface on a screen of the user device 140.

Figure 2:
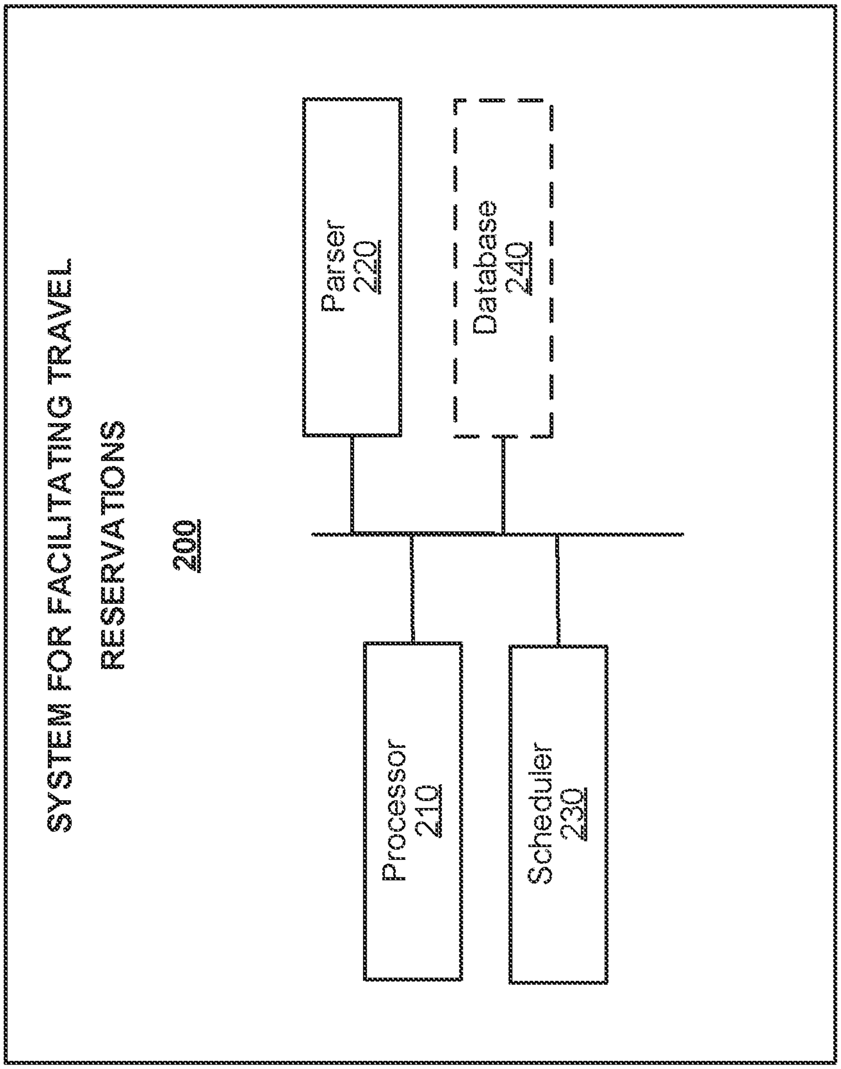
FIG. 2 is a block diagram showing various modules of the system for facilitating travel reservations.

FIG. 2 is a block diagram showing various modules of the system 200 for facilitating travel reservations, in accordance with certain embodiments. The system 200 may comprise a processor 210, a parser 220, a scheduler 230, and an optional database 240. The processor 210 may include a programmable processor, such as a microcontroller, central processing unit (CPU), and so forth. In other embodiments, the processor 210 may include an application-specific integrated circuit (ASIC) or programmable logic array, such as a field programmable gate array, designed to implement the functions performed by the system 200.

The processor 210 may receive a travel related query. The travel related query may be provided by a user. Moreover, the travel related query may be provided using a natural language, a typed text, a selection of preexisting options, and so forth. Examples of typed text include an email, a Short Message Service (SMS) message, a Rich Communication Services (RCS) message, and a chat message. In a further embodiment, the travel-related query may be associated with a group of users. The processor 210 may ascertain an attribute set relevant to the travel related query. The attributes may include parameters of the itinerary, such as a flight, a hotel, an origin city, a destination city, a departure date, an arrival date, time, prices, travel class, and other attributes, such as ground transportation options, tours, and the like. Each attribute may have an option. For example, the options for the 'hotel' attribute may include 'hotel 1' in a destination city, 'hotel 2' in the destination city, and any other hotels that may satisfy the travel-related query.

The parser 220, being in communication with the processor 210, may be operable to parse the travel related query to derive attribute values related to the attribute set and at least one constraint related to the travel-related query. In some embodiments, a constraint may include a budgetary constraint, a logical constraint, a conditional constraint, a timing constraint, and the like. The parser 220 may be further operable to initiate the at least one attribute of the attribute set with the derived attribute values.

In an example embodiment, the at least one attribute with one possible value is a necessarily satisfied condition. In other words, the user may need to provide at least one attribute of the travel-related query.

Thereafter, the processor 210 may rank at least one attribute based on user preferences. The user preferences may be determined based on the travel related query. Additionally, the user preferences may be determined based on preexisting selections (for example, selections made by the user in a user profile associated with the system 200). The preexisting selections may be received from the user using a man-machine interface. Based on the ranking, the processor 210 may assign weights to the at least one attribute to create at least one weighted attribute. Thus, at least one weighted attribute may be created. The processor may also associate cost data with the at least one weighted attribute. Specifically, each specific weighted attribute may be associated with cost data related to this specific weighted attribute.

The scheduler 230 may be operable to search for the feasible travel itineraries based on the least one attribute and the user preferences. The scheduler 230 may score the feasible travel itineraries based on the at least one weighted attribute and the cost data associated with the at least one weighted attribute for each of the feasible travel itineraries.

Upon scoring the feasible travel itineraries, the processor 210 may present at least one travel itinerary selected from the feasible travel itineraries based on the scoring. The processor may also select an optimal travel itinerary based on the at least one constraint. Specifically, the optimal travel itinerary may be selected from the feasible travel itineraries based on the scoring of the feasible travel itineraries. Additionally, the at least one travel itinerary and corresponding scores may be visualized to the user. The optimal travel itinerary may be presented to the user via a user device.

In an example embodiment, the processor 210 may further be configured to rank the feasible travel itineraries based on the scoring and select one or more further optimal travel itineraries to be provided the user. The one or more further optimal travel itineraries may be selected from the feasible travel itineraries based on the ranking. In other words, one or more top feasible travel itineraries in a ranked list of feasible travel itineraries may be presented to the user.

In an example embodiment, the system may be configured to identify at least one of the feasible travel itineraries for which a budget allocation is unutilized. The budget allocation may be associated with the at least one constraint. Specifically, the budget allocation may include a cost of the itinerary indicated by the user in the travel-related query. In other words, the at least one of the feasible travel itineraries the cost of which is lower than the cost of the itinerary indicated by the user may be identified. The system 200 may further be configured to present the at least one of the feasible travel itineraries for which the budget allocation is unutilized to the user.

The optional database 240 may be configured to store at least data related to the travel related query, the user preferences, and so forth.

Thus, the system 200 may be operable to customize, for each individual traveler, how travel itinerary options are identified and presented for purchase consideration. Furthermore, the choices, namely the travel itineraries, may be presented to the user in ways that minimize search cost and maximize path-to-purchase efficiency.

Figure 3:
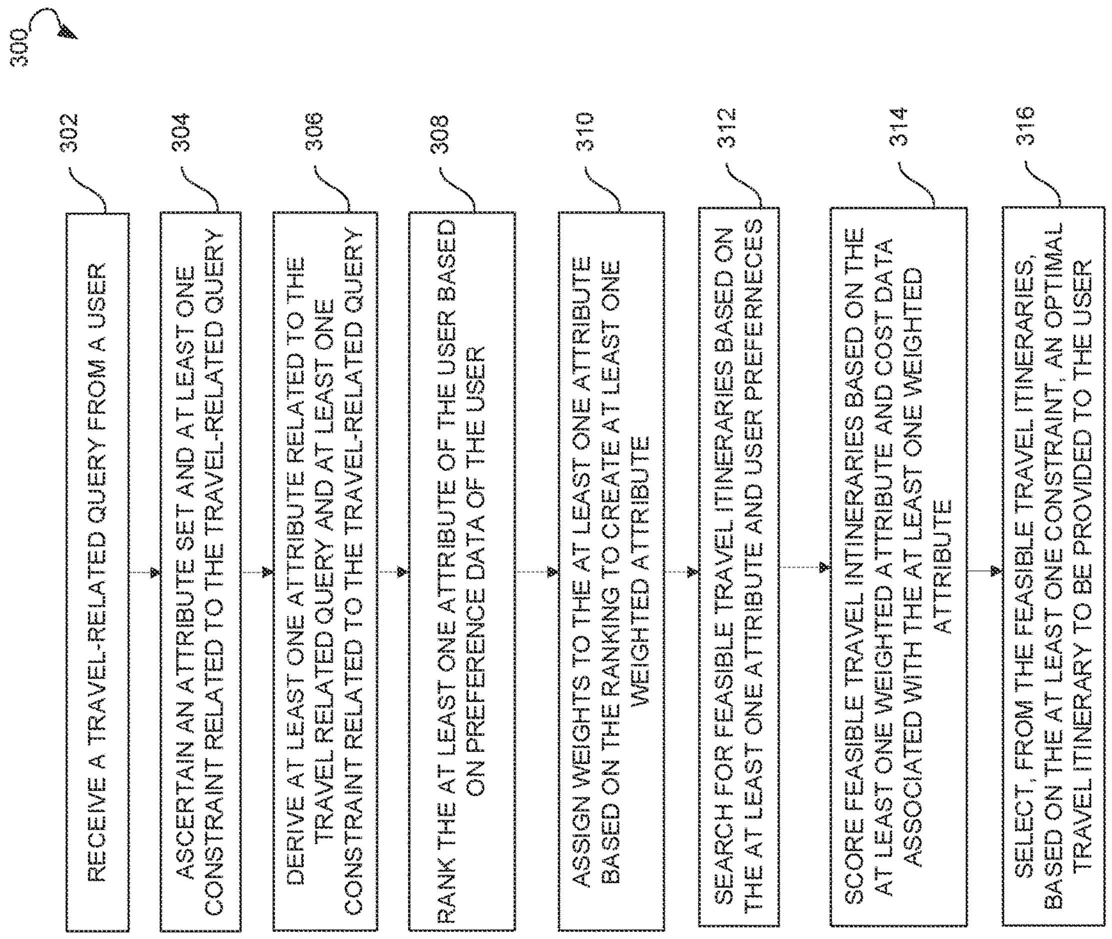
FIG. 3 is a process flow diagram showing a method for facilitating travel reservations.

FIG. 3 is a process flow diagram showing a method 300 for facilitating optimization-based travel itinerary planning within the environment described with reference to FIG. 1. The method 300 may commence with receiving a travel related query at operation 302. In an example embodiment, the travel related query may be provided via at least one of the following: a natural language, a typed text, a selection of preexisting options, and so forth. In a further example embodiment, the travel related query may be associated with a group of users.

The method 300 may continue with ascertaining an attribute set relevant to the travel related query and at least one constraint related to the travel-related query at operation 304. At operation 306, the method may include parsing the travel related query to derive attribute values related to the attribute set. In some embodiments, a constraint may include a budgetary constraint, a logical constraint, a conditional constraint, a timing constraint, and the like. In an example embodiment, a plurality of attributes, i.e., an attribute set relevant to the travel-related query, may be derived. The attributes may include parameters of the itinerary, such as a flight, a hotel, an origin city, a destination city, a departure date, an arrival date, time, prices, travel class, and other attributes, such as ground transportation options, tours, and the like. Each attribute may have an option. For example, the options for the 'hotel' attribute may include 'hotel 1' in a destination city, 'hotel 2' in the destination city, and any other hotels that may satisfy the travel-related query.

In an example embodiment, the at least one attribute with one possible value is a necessarily satisfied condition. In other words, the user may need to provide at least one attribute of the travel-related query.

Upon the parsing, at least one attribute of the attribute set may be initiated with the derived attribute values at operation 306. In an example embodiment, the at least one attribute with one possible value is a necessarily satisfied condition.

At operation 308, the at least one attribute may be ranked based on user preferences. In an example embodiment, the user preferences may be determined based on the travel related query. In another example embodiment, the user preferences may be determined based on preexisting selections.

The method 300 may optionally comprise providing a man-machine interface to receive the preexisting selections from a user. More specifically, the method 300 may include a front-end instantiation of user preferences, where the user preferences are obtained by parsing the semantic intent underlying the travel related query. The method 300 may further include a back-end specification of the user preferences by reading user-specified rank-order preference information (i.e., the preexisting selections) from a database (for example, the preference information related to airlines, hotels, etc.).

The method 300 may continue with operation 310, at which weights may be assigned to the at least one attribute based on the ranking. Thus, at least one weighted attribute may be created.

At operation 312, the method 300 may include searching for feasible travel itineraries based on the least one attribute and the user preferences. Upon the search, the feasible travel itineraries may be scored at operation 314. The scoring may be based on the at least one weighted attribute and the cost data associated with the at least one weighted attribute for each of the feasible travel itineraries. In example embodiments, the method 300 may optionally include adjusting the scoring based on forecasted weather conditions at a time of travel.

Upon scoring, the method 300 may continue with operation 316, at which at least one travel itinerary selected from the feasible travel itineraries based on the scoring may be presented. An optimal travel itinerary may be selected from the feasible travel itineraries based on the at least one constraint at operation 316. Specifically, the optimal travel itinerary may be selected from the feasible travel itineraries based on the scoring of the feasible travel itineraries. In example embodiments, the presenting of the at least one travel itinerary may be performed within a predetermined time after the receiving of the travel related query. The method 300 may further optionally include visualizing the at least one travel itinerary and corresponding scores.

In an example embodiment, the method 300 may further include ranking the feasible travel itineraries based on the scoring and selecting one or more further optimal travel itineraries to be provided the user. The one or more further optimal travel itineraries may be selected from the feasible travel itineraries based on the ranking. In other words, one or more top feasible travel itineraries in a ranked list of feasible travel itineraries may be presented to the user.

In an example embodiment, the method 300 may include identifying at least one of the feasible travel itineraries for which a budget allocation is unutilized. The budget allocation may be associated with the at least one constraint. The constraint regarding budget allocation may be specified, for example, in a corporate travel policy associated with the user 130. Specifically, the budget allocation may include a cost of the itinerary indicated by the user in the travel-related query. In other words, the at least one of the feasible travel itineraries the cost of which is lower than the cost of the itinerary indicated by the user may be identified. The method 300 may further include presenting the at least one of the feasible travel itineraries for which the budget allocation is unutilized to the user.

The method 300 may be directed to determining how the utility, or value, the consumer derives from a given travel itinerary is characterized and evaluated. This utility may be derived from the defining elements of each travel itinerary (e.g., flight characteristics, such as class of service, etc.). Thus, the method 300 may be used for prioritizing and ranking itinerary options.

The operations of the method 300 and elements of the system 200 are further described in detail below.

In an example embodiment, a typical consumer may construct an itinerary portfolio, also referred herein to as a travel itinerary portfolio, by constructing sets of choices using the system 200. Specifically, the itinerary portfolio may include a set of attributes of the travel itinerary. The process of constructing the itinerary portfolio using the system 200 may consist of the steps of (i) specification of the individual choice sets that correspond to the desired and/or relevant attributes of the itinerary; (ii) multiattribute valuation and costing of individual choice set options; and (iii) specification of relevant constraints. Completing this set of steps may provide a numerically specified itinerary portfolio, which may be amenable to numerical evaluation and analysis. In possession of the enumerated itinerary portfolio, the system 200 may identify itinerary portfolio allocations, i.e., a specific combination of choices across all of the attributes contained in a given portfolio with one option selected from each choice set, that maximize a value of the itinerary portfolio value for a specified constraint of the customer, such as a budget. The value of the itinerary portfolio may include a multiattribute score related to the travel itinerary and determined by scoring feasible travel itineraries based on the weighted attributes of the travel itinerary and the cost data associated with each of the weighted attributes.

In an example embodiment, a typical company may construct a corporate travel policy in a manner similar to how a typical consumer would construct an itinerary portfolio, by constructing sets of choices using the system 200.

Specification of Relevant Attribute Sets

The system for facilitating travel reservations may support a travel lexicon to accommodate and fulfill a wide range of possible travel related query. Therefore, within the system, the travel related queries can be expressed via natural language (typed or spoken). The system may be operable to support basic travel queries, Q, which take the form of $$Q = \{q_s, q_d, q_t\},$$

where $q_s$≡starting point (airport, city, etc.); $q_d$≡final destination; $q_t$≡duration of trip.

Each travel query, Q, can be contextualized or made more specific via attributes that are instantiated via the travel related query in natural language. Accordingly, the system may be operable to identify and specify attribute sets that are relevant to the travel related query (which, in fact, relates to goals and objectives expressed by the user in the travel related query). It is possible to reason about whether the goals and objectives are met in terms of attribute values. In the context of a travel itinerary, attribute values may include the desire for an aisle seat, a non-stop flight, and the like. Therefore, the system can be used to find a means by which it is possible to reason whether the travel itinerary is capable of providing specified attribute values.

Therefore, the processor of the system is operable to define relevant attribute sets (RAS) that are linked/tied to context-defining attribute values specified in the given travel query, Q. The attribute sets may pertain, specifically, to flights (F), hotels (H), and origin (O) and destination (D), and may be defined as follows:

$$RAS(Q, F) = \{f \in F \mid \text{isRelevant\_Flights}(f, Q) = \text{true}\};$$

$$RAS(Q, H) = \{h \in H \mid \text{isRelevant\_Hotels}(h, Q) = \text{true}\};$$

$$RAS(Q, O) = \{o \in O \mid \text{isRelevant\_O } \&D(o, Q) = \text{true}\}.$$

In the characterization above, isRelevant_Flights is a logical predicate that asserts that attribute f is relevant for travel related attribute values specifiable in the travel related query, Q. Similar interpretations hold for the predicates isRelevant_Hotels and isRelevant_O&D.

Thus, the relevant attribute sets may be specified for flights, hotels, and origin and destination (O&D), respectively. For example, the RAS for Flights, RAS(Q, F), covers five attributes that may be supported within the travel lexicon of the parser of the system. These attributes, and their possible values, are shown in table 1 below.

TABLE 1

| RAS - Flights | Attribute Name | Values |
|---|---|---|
| $F_1$ | Carrier | Air Canada, American Airlines, et al. |
| $F_2$ | Number of Stops | {0, 1, 2} |
| $F_3$ | Class of Service | Economy, Economy-Refundable, Business-Restricted, Business-Unrestricted |
| $F_4$ | Equipment | Airbus, Boeing, Embraer, et al. |
| $F_5$ | Desired Departure/ Arrival Time | Local Time, relative to consumer's origin; time at Desired Destination |

The RAS for hotels, RAS(Q, H), are shown in table 2 below and may include five attributes that are typically encountered in hotel searches.

TABLE 2

| RAS - Hotels | Attribute Name | Values |
|---|---|---|
| $h_1$ | Hotel Chain | Hilton, Marriott, et al. |
| $h_2$ | Star Rating | {0, 1, 2, 3, 4, 5, 6, 7} |
| $h_3$ | Smoking Preference | Y/N |
| $h_4$ | Bed Type | Twin, King, etc. |
| $h_5$ | Hotel Name | Local Time (relative to User's IP address) |

Finally, the RAS for O&D, RAS(Q,O), is shown in table 3 below and may enable the consumer to specify a country, city, city code, or airport code in a given travel request.

TABLE 3

| RAS - O&D | Attribute Name | Values |
|---|---|---|
| $o_1$ | Country | Argentina, United States, United Kingdom, et al. |
| $o_2$ | City | London, Toronto, Washington, et al. |
| $o_3$ | City Code | WAS, et al. |
| $o_4$ | Airport Code | AUS, BOI, SEA, et al. |

Parser-Enabled Instantiation of Attributes

As mentioned above, the capabilities of the system can be utilized to contextualize and add specificity to travel related requests, thereby enabling the consumer to explicitly specify sought after or desired attribute values. The RASs defined above make it possible to operationalize the "front-end" and "back-end" integration discussed above. In this regard, it may be explored what this front-end portion means for any set of the attributes contained in each RAS to be activated or instantiated within the context of a given travel related query, Q.

Generally speaking, the fulfillment of a travel related query may require the instantiation of one or more attributes. These instantiated attributes enable adding context or specificity to the travel related query. For this purpose, the Cartesian product, Z, of three relevant attribute sets may be defined:

$$Z = F \times H \times O,$$

which, given the specifications for F, H, and O, above, gives rise to the following ordered n-tuple:

$$z = (f1, f2, f3, f4, f5, h1, h2, h3, h4, h5, o1, o2, o3, o4). \tag{1}$$

If vector notation is used and if $F=[f_1, f_2, f_3, f_4, f_5]$, $H=[h_1, h_2, h_3, h_4, h_5]$, and $O=[o_1, o_2, o_3, o_4]$, then Equation (1) can be expressed succinctly as follows:

$$Z = [F, H, O]. \tag{2}$$

In the context of a given travel related query, Q, Equations (1) and (2) can be used for representing those attributes that are instantiated within the travel related query. Some of the travel attributes may be instantiated on a continuing basis, in that the attributes may represent characteristic features of any feasible travel itinerary (e.g., every travel itinerary containing flights can be characterized by one or more air carriers, and so forth).

For the purpose of this disclosure, it can be assumed that instantiability is binary-valued. The space of all possible instantiations of the attributes is of order $2^n=2^{14}$, and is defined as the cross product of the binary-valued state space associated with each individual attribute.

This scheme describes which travel attributes matter to the consumer. In general, the more attributes that are ascertained, the more specific the travel related query is. Therefore, the travel related query may be assumed to be closed with respect to a given RAS and a given query, Q, if all the attributes contained within the set of attributes are instantiated. Conversely, the travel related query may be assumed to be open if only a partial (possibly empty) subset of travel attributes is ascertained.

Further, let Z(Q) denote a query-driven set of ascertained attributes, and '*' denote those attributes that are non-ascertained. Therefore, a query-driven set of the ascertained attributes may be represented as follows:

$$Z(Q) = (f_1, f_2, ^*, ^*, f_5; h_1, ^*, ^*, h_4, ^*; ^*, ^*, ^*, o_4). \tag{3}$$

In Equation (3), query Q ascertains three of our travel related attributes: $f_1$, $f_2$, and $f_5$ (i.e., the natural language request specifies user preferences pertaining to 'Carrier,' 'Number of Stops,' 'Class of Service,' and 'Desired Departure Time'). The query Q also ascertains hotel-related attributes pertaining to 'Hotel Chains' and 'Bed Type,' together with the origin and destination attribute pertaining to 'Airport Codes.' Therefore, for the travel related attributes, Equation (3) is open with respect to attributes 3 and 4; for the hotel attributes, Z(Q) is open with respect to attributes 2 and 3; and for the origin and destination attributes, the travel related query is open with respect to attributes 1, 2, and 3.

Identification and Specification of Individual Choice Sets

In a travel-specific example, a consumer, who is a business traveler, plans to travel by himself on a two-day/one-night trip that has one destination. The following six itinerary portfolio groups, i.e., attributes of the travel-related query, are deemed as most relevant to the travel planning process of the consumer:

Ground transportation options from a home of the consumer to an origin airport;

Outbound flight itinerary options;

Ground transportation options at a destination city;

Hotel options at the destination city;

Return flight itinerary options;

Ground transportation options from the airport to the home of the consumer.

The system 200 may specify the choice sets that correspond to each of these itinerary portfolio groups.

Let A denote the set of ground transportation options that the consumer wishes to consider for getting from the consumer from home to the origin airport:

$$A = \{a_1, a_2, a_3, a_4\},$$
$$\text{where}$$
$$a_1 = \text{Subway};$$
$$a_2 = \text{Uber–Regular};$$
$$a_3 = \text{Taxi};$$
$$a_4 = \text{Uber–Black}.$$

Let B denote the set of outbound flight options that the consumer wishes to consider:

$$B = \{b_1, b_2, b_3, b_4, b_5\},$$
$$\text{where}$$
$$b_1 = \text{Cheapest (2–stops)};$$
$$b_2 = \text{Economy (1–stop)};$$
$$b_3 = \text{Economy (non–stop)};$$
$$b_4 = \text{Economy}^+ \text{ (non–stop)};$$
$$b_5 = \text{Business Class (non–stop)}.$$

Let C denote the set of options that the consumer wishes to consider as ground transportation alternatives at her destination city:

$$C = \{c_1, c_2, c_3\},$$
$$\text{where}$$
$$c_1 = \text{User Taxi};$$
$$c_2 = \text{Use Uber–Regular};$$
$$c_3 = \text{Procure a Rental Car}.$$

Let D denote the set of hotel accommodation options that the consumer wishes to consider at her destination city:

$$D = \{d_1, d_2, d_3, d_4\},$$
$$\text{where}$$
$$d_1 = \text{3–Star Chain};$$
$$d_2 = \text{4–Star Chain};$$
$$d_3 = \text{4–Star Boutique (flash sale)};$$
$$d_4 = \text{5–Star Boutique}.$$

Let E denote the set of return flight options that the consumer wishes to consider:

$$E = \{e_1, e_2, e_3, e_4, e_5\},$$
$$\text{where}$$
$$e_1 = \text{Cheapest (2–stops)};$$
$$e_2 = \text{Economy (1–stop)};$$
$$e_3 = \text{Economy (non–stop)};$$
$$e_4 = \text{Economy}^+ \text{ (non–stop)};$$
$$e_5 = \text{Business Class (non–stop)}.$$

Finally, let F denote the set of ground transportation options that the consumer wishes to consider for her return home from the airport:

$$F = \{f_1, f_2, f_3, f_4\},$$
$$\text{where}$$
$$f_1 = \text{Subway};$$
$$f_2 = \text{Uber–Regular};$$
$$f_3 = \text{Taxi};$$
$$f_4 = \text{Uber–Black}.$$

Multiattribute Formulation—Preliminaries

The system further utilizes the RASs specified above to associate a determinate value with each travel itinerary as a function of the ascertained attributes that are associated with a given travel related query. In this way, each feasible itinerary may be characterized in terms of a single, aggregate (dimensionless) value, which may be used to prioritize and rank itinerary attributes.

The key elements for performing prioritizing and ranking may include: a finite number of travel itineraries, $\mathcal{A}$; a finite number of attributes, I; a weight, $w_i$, for each attribute $i \in I$; a value score for each attribute and itinerary, $v_i(a)$, for itinerary $a \in \mathcal{A}$ and attribute $i \in I$; and total value, V, of itinerary $a \in \mathcal{A}$ defined as the weighted sum $$\Sigma_i w_i v_i(a).$$

Alternatively, using the vector notation introduced earlier, the total value of an itinerary choice set is succinctly expressed as $$V(F, H, O) = \Sigma wv(\cdot),$$

where w denotes vector tradeoff weights for F, H, O. For ease of analysis and exposition, it is convenient to also assume that $$\forall\, i \in I,\ w_i \geq 0 \text{ and } \sum_i w_i = 1;\ \forall\, a \in A \text{ and } i \in I,\ v_i(a) \in [0, 1],$$

and for each i∈ $\mathcal{A}$, there are a', a"∈ $\mathcal{A}$ $$v_i(a') = 1 \text{ and } v_i(a'') = 0;$$

itinerary a' is at least as preferred as itinerary a" if wv(a') ≥wv(a").

The next step is to integrate front-end attribute ascertaining and back-end-specified consumer preferences. This may require some mathematical preliminaries described below.

Mathematical Preliminaries

As discussed earlier, it is necessary to take into consideration the relationship between a "front-end" of the system (where parser-enabled attribute instantiations occur) and a "back-end" of the system (where consumers provide profile information that contains preference information). For this purpose, permutations on lexicographically ordered finite sets can be used, where each permutation contains information pertaining to the rank-order preferences of the consumer (for example, for airlines, hotels, and the like).

The back-end-specified rank-order preference information can be utilized to impute numerical values which serve as the primary means by which numeric specifications for the value functions may be determined: $v_i(a)$.

The concept of a permutation can enable explicitly referencing/indexing rank-order preference data obtained via "user profiles" on the back-end of the system. For this purpose, let S denote a finite set consisting of n elements:

$$S = \{x_1, x_2, \ldots, x_n\}.$$

For ease of exposition and analysis, the restriction can be imposed that the elements of S are lexicographically ordered such that $$x_1 \leq x_2 \leq \ldots \leq x_n.$$

The kind of permutation, n, is a bijection, i.e., a one-to-one and onto function from S onto itself:

$$\pi: S \to S.$$

Example 1. Let S={$x_1$, $x_2$, $x_3$, $x_4$, $x_5$}, with the following illustrative graph of π: π($x_1$)=$x_2$, π($x_2$)=$x_3$, π($x_3$)=$x_1$, π($x_4$)=$x_5$, and π($x_5$)=$x_4$. This permutation can be expressed in matrix form as $$\pi = \begin{pmatrix} x_1 & x_2 & x_3 & x_4 & x_5 \\ x_2 & x_3 & x_1 & x_5 & x_4 \end{pmatrix} \tag{4}$$

If the lexical order described above is treated as fixed, the permutation can be expressed in its simpler Cartesian form:

$$\pi = [x_2, x_3, x_1, x_5, x_4]. \tag{5}$$

Example 2. As a travel-specific example, there are the following 5 airlines, listed in alphabetical order in table 4:

TABLE 4

| Lexical Element | Airline |
|---|---|
| x1 | American |
| x2 | Jet Blue |
| x3 | Southwest |
| x4 | United |
| x5 | Virgin America |

The consumer may provide the following rank-order preference information for this set of airlines:

Virgin America>Southwest>United>American>Jet Blue. This preference ordering can be representable by:

$$\pi = [5, 3, 4, 1, 2]. \tag{6}$$

This example can be generalized to an arbitrary n:

$$\pi = [i_1, i_2, \ldots, i_n], \text{ where } \pi \in S_n \text{ and} \tag{7}$$
$$\pi(x_1) = x_{i_1}, \pi(x_2) = x_{i_2}, \ldots, \pi(x_n) = x_{i_n}.$$

Imputation of Marginal Value Functions Via Rank-Ordered Preferences

Equation (7) can be utilized to encode preference information concerning air carriers, hotels, and the like. As described below, each permutation vector is used to impute numerical weights of relative importance or value for these vector elements. For the purposes of this disclosure, two numerical approaches can be utilized, namely rank sum and rank reciprocal.

Rank Sum (RS). N attributes or lexicographically ordered elements are ranked, and each attribute is weighted according to the formula, $$w_i = \frac{N - r_i + 1}{\sum_j (N - r_j + 1)}, \tag{8}$$

where $r_i$ is the rank position of the attribute or element.

Rank Reciprocal (RR). Weights are derived from the normalized reciprocals of a rank of the attribute or element:

$$w_i = \frac{1/r_i}{\sum_j (1/r_j)}.$$

Example 3. Applying Equations (7), (8), and (9) to the airline of Example 2 yields the numerical values shown in table 5 below.

TABLE 5

| Airline | Rank | RS Weight | RR Weight |
|---|---|---|---|
| American | 4 | 0.133 | 0.109 |
| Jet Blue | 5 | 0.067 | 0.088 |
| Southwest | 2 | 0.267 | 0.219 |
| United | 3 | 0.200 | 0.146 |
| Virgin America | 1 | 0.333 | 0.438 |

Indexing the Multiattribute Value Model

Within the context of a given travel related query, only the attributes that are instantiated are taken into consideration. Therefore, the instantiated attributes need to be indexed. To this end, a travel related query, Q, gives rise to a vector Z(Q) of instantiated attributes. For example, the travel related query, Q, generates the following attribute instantiations:

$(f_1, f_2, *, *, f_5; h_1, *, *, h_4, *; *, *, *, o_4)$, in which case $$Z(Q) = (f_1, f_2, f_5; h_1, h_4, o_4). \tag{10}$$

From Equation (10), three index sets can be extracted, which enable indexing multiattribute aggregation model:

$$I_F = \{1, 2, 5\}$$
$$I_H = \{1, 4\}$$
$$I_O = \{4\}.$$

In more general terms, the index sets illustrated above can be defined as follows:

$$I_F = \{i \mid i \in F \text{ and } f_i \in Z(Q) = \text{true}\}; \tag{11}$$
$$I_H = \{j \mid j \in H \text{ and } h_j \in Z(Q) = \text{true}\}; \tag{12}$$
$$I_O = \{k \mid k \in O \text{ and } o_k \in Z(Q) = \text{true}\}. \tag{13}$$

Having properly indexed the instantiated attributes that the travel related query, Q, gives rise to, the multiattribute aggregation model described earlier can be specified in the specialized form that its application here requires:

$$V_Q(F, H, O) = \sum_{i \in I_F} w_i v_{f_i}(\cdot) + \sum_{j \in I_H} w_j v_{h_j}(\cdot) + \sum_{k \in I_O} w_k v_{o_k}(\cdot). \tag{14}$$

The linear additive nature of Equation (14) enables using the portions of the aggregation model that are required by the travel related query, Q. For example, the travel related query that only requests a flight itinerary will utilize only the first of the three summations shown in Equation (14).

The numerical specification of Equation (14) is essentially a two-step process and includes a specification of the relevant single attribute value functions $v_{fi}(\bullet)$, $v_{hj}(\bullet)$, and $v_{ok}(\bullet)$, and a specification of the (scaling) weights $w_i$, $w_j$, and $w_k$. Each of these elements can be considered in turn.

Specification of Single-Attribute Value Functions—Flights

In specifying the single-attribute value functions, $v_{fi}(\bullet)$ associated with flights, there is reason to presume the existence of a set, $\mathcal{A}$, of feasible itinerary solutions (FISs), comprised of elements $a_1, a_2, \ldots, a_m$. In the case of a travel related query, each travel itinerary $a_i \in \mathcal{A}$ is evaluated on attributes $F_1, \ldots, F_m$ and a marginal value function, $v_j(f_{ij})$, on the performance $f_{ij}$ of the travel itinerary $a_i$ under attribute Fj. Each of these five travel related attributes is considered below.

Carrier ($F_1$). This attribute captures the preferences of the consumer related to an airline carrier. In the context of travel related queries, this attribute exists on a continuous basis, in the sense that every itinerary that involves air travel is characterized by a determinate carrier value.

In formally characterizing this attribute, it is distinguished between two types of travel related requests: those where the consumer expresses an explicit, named preference for one or more airlines (e.g., "Please show me all of the United flights from IAD to SFO for Friday"; "Can I see what Virgin or American flights I can take next Monday to London?", etc.) and those where no such preference is expressed. From a consumer choice perspective, the request for a specific carrier (or set of carriers) acts as a filter: if the scheduler is able to return one or more feasible solutions that satisfy the travel related query, then those travel itinerary options are presented to the consumer for consideration, and the multiattribute value model is invoked only if other travel related attributes in RAS(Q, F) have been instantiated.

In all other instances involving travel related queries, each feasible itinerary solution $a_i \in \mathcal{A}$ must be evaluated on attribute $F_1$. To this end, the marginal value function $v_1(f_{i1})$ needs to be characterized and evaluated on the performance $f_{i1}$ of itinerary $a_i \in \mathcal{A}$ under this attribute. Equation (14) serves as the basis for a numeric scheme that enables the single-attributed scoring of each feasible itinerary solution yielded by the Scheduler, as measured by the Carrier attribute.

Since the number of carriers is finite, it can be assumed that $F_1$ is characterized by a finite domain $D_{F1}$. Numeric characterization of the marginal value function can proceed along several possible lines. It is possible to envision systematic attempts at the elicitation of consumer preferences regarding air carriers. Alternatively, it is also possible to envision schemes whereby these carrier preferences are learned over time in a systematic manner. The approach adopted herein exploits the existence of stated preference information provided on the back-end of the system. This information takes the form of rank-order preference data concerning air carriers, and this data is used, in conjunction with the RS and RR equations described earlier, to arrive at a numeric characterization for $v_1(f_{i1})$.

Furthermore, the existence of a set, C, consisting of a lexically-ordered set of air carriers is presumed:

$$C = \{C1, C2, \ldots, Cn\}.$$

Given this set, the existence of a permutation vector, $n_c$, is presumed, and the vector encodes rank-order preference information for the air carriers contained in C:

$$\prod_c = [\pi_c^1, \ldots, \pi_c^n].$$

Equation (8) can now be re-written as follows:

$$w_i^c = \frac{n - \pi_c^i + 1}{\sum_j (n - \pi_c^i + 1)}, i = 1, \ldots, n \tag{15}$$

which provides a rank-order-derived importance weight, $w^c_i$, for carrier i.

Further, each travel itinerary $\mathcal{A} = \{a1, \ldots, a2\}$ is scored on attribute $F_1$. It is assumed that each travel related itinerary $a_i \in \mathcal{A}$ is characterized by a determinate carrier value $$x_{ij}^k = x_{ij}^1 = c_i \in C,$$

where i indexes travel itineraries (i.e., i=1, . . . , m), j indexes carriers (i.e., j=1, . . . , n), and k indexes the instantiated (ascertained) attributes. Given this domain characterization, the marginal value function can be characterized as follows:

$$v_1(x_{ij}) = \begin{cases} w^c_{\pi_c^j}, & \text{if } a_i \in A \text{ and } x_{ij} \neq \emptyset \\ 0, & \text{otherwise} \end{cases},$$

where $$w^c_{\pi_c^j}$$

is the rank-order-derived weight, obtained via Equation (15), associated with carrier $$\pi_c^j,\ j = 1, \ldots, n.$$

Number of Stops ($F_2$). When instantiated, this attribute captures the consumer preferences for the number of leg segments contained within a given Origin and Destination city pair. Generally speaking, most travelers prefer less stops to more, but often this convenience comes at a cost (i.e., it increases the cost associated with an itinerary). For the purposes of this disclosure, this attribute is modeled as a constructed attribute, defined in terms of three attribute levels shown in table 6:

TABLE 6

| Attribute level | State |
|---|---|
| 0 | If Non-Stop |
| 1 | If 1-Stop |
| 2 | If 2-Stop |

The baseline parameterization for the single-attribute value function, $v_2(\bullet)$, is given as follows:

$$\begin{aligned} v_2(0) &= 1 \\ v_2(1) &= 0.7. \\ v_2(2) &= 0 \end{aligned}$$

Figure 4:
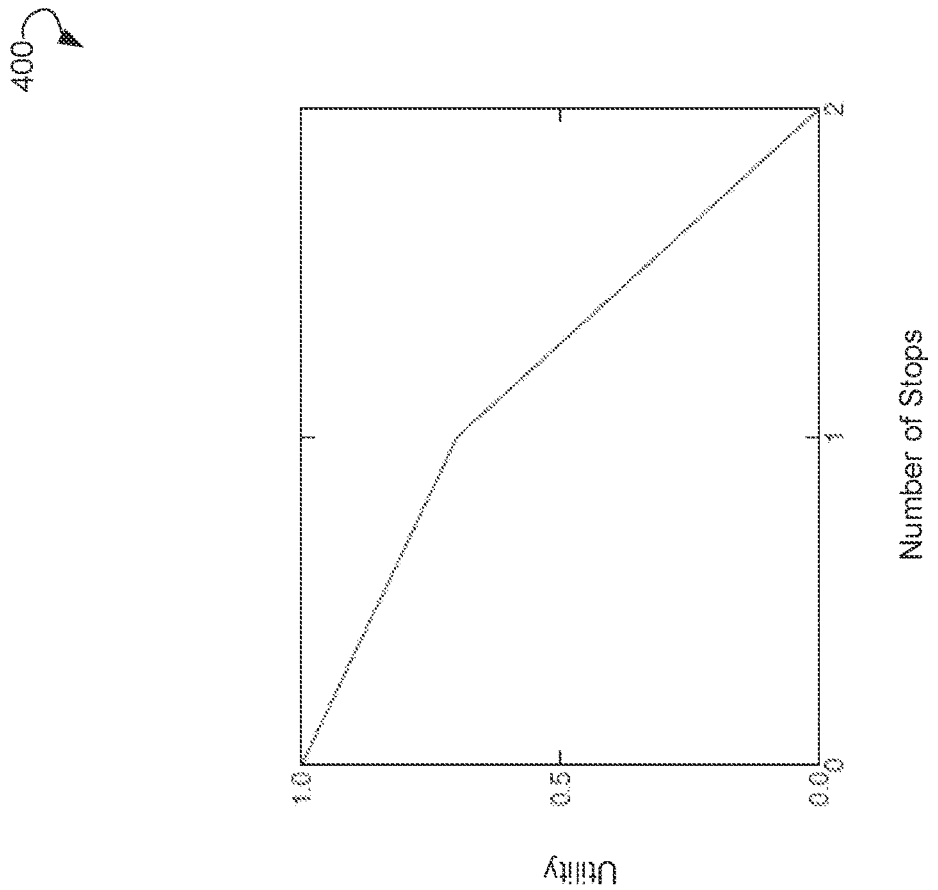
FIG. 4 illustrates dependency of utility of a travel itinerary on a number of stops.

FIG. 4 shows dependency of utility of the travel itinerary (namely, matching of the travel itinerary with the consumer preferences) on a number of stops of the travel itinerary.

Class of Service ($F_3$). This attribute captures the consumer preferences for the specific classes of service offered by most airlines. When this variable is instantiated, the user is expressing a preference for a particular class of service. In looking, then, to measure the contribution to overall value that the instantiation of this attribute has on the overall value of a given itinerary, it is necessary to capture the conditional nature of this marginal value proposition. For this purpose, an "Ask/Get" matrix can be used, which, for the purposes of this disclosure, is defined as shown in table 7:

TABLE 7

| | Economy | Econ.-Refundable | Bus.-Restricted | Bus.-Unrestricted |
|---|---|---|---|---|
| "Economy" | 0.9 | 0.6 | 0.1 | 0 |
| "Econ.-Refundable" | 0.6 | 0.9 | 0.2 | 0 |
| "Bus.-Restricted" | 0 | 0.4 | 0.9 | 0.6 |
| "Bus.-Unrestricted" | 0.1 | 0.5 | 0.7 | 0.9 |

In Table 7, the column entries contained in quotes ("Economy," "Econ.—Refundable," "Bus.—Restricted," "Bus.—Unrestricted") denote the actual consumer-provided travel related query, whereas the row entries denote the class of service associated with a given itinerary, $a_i \in \mathcal{A}$. If, for example, the consumer asks for a "Business-Restricted" ticket, but the feasible itinerary choice is an Economy-Refundable ticket, then that itinerary is assigned a weight of 0.4.

Equipment ($F_4$). This attribute becomes instantiated when the consumer expresses an explicit equipment-related preference. The consumer may, for example, request a wide-body plane (e.g., an A380, A340, etc.). Within the parser, such travel related query can be invoked at various levels of aggregation, e.g., body type, model type, and so forth. For ease of analysis, $v_4(\bullet)$ is characterized an indicator variable, where a travel related query, Q, containing a specific equipment-related request gives rise to one or more travel itinerary options that either succeed or fail to satisfy the equipment request. Accordingly, the weight function is formally specified as follows:

$$v_4(x_i) = \begin{cases} 1, & \text{if for itinerary } a_i \in A,\ \mathit{DesiredEquipment} = \text{true} \\ 0, & \text{otherwise} \end{cases},$$

where DesiredEquipment is a logical predicate that returns a truth-value obtained via look-up tables (may be stored in the database) that define the relevant set of equivalence classes. For the purposes of this disclosure, for the wide/narrow body distinctions, the basic taxonomy supported within the parser is shown in table 8 below.

TABLE 8

| Wide Body Jet | Narrow Body Jet | Narrow Body Continued |
|---|---|---|
| Airbus: 380, A330, A340, A350 | Airbus: A319, A320, A321 | Embraer: E170/5, E190/5, EMB120, ERJ145 family |
| Boeing: B787, B777, B767, B747, MD-11 | Boeing: B737, B757, MD83/90 | Bombardier: CRJ, Dash-8 |

For example, if the consumer requests, within a given query, a wide-body plane, and a travel itinerary contains any of the jets listed in the first column of table 8 above, then the weight function is assigned a value of 1; otherwise it is assigned a zero.

Desired Departure/Arrival Time ($F_5$). Time factors into the travel plans and desires of most consumers. For example, typical requests may include the following: "I need to be in Los Angeles first thing Monday morning for a meeting"; "For my trip to New York, I'd like to arrive in New York in time to have dinner with Jonathan," and the like. The system has the ability to include attributes that allow capturing and representing these kinds of time-related preferences. Accordingly, two attributes that capture/represent preferences pertaining to desired departure and arrival times, respectively, can be used.

In the first of these two instances, preferences pertaining to a desired departure time (DDT) of consumer need to be captured. When instantiated, the DDT can be expressed precisely as a time of day (12- or 24-hour format), or as a time-period (e.g., "morning," "afternoon," "evening," or other possible sub-categories within these general categorizations). In practical terms, the marginal value function, $v_5(xj)$, focuses on the relative duration of period between the departure time associated with the outbound flight (OF) associated with itinerary $a_i \in \mathcal{A}$, and the stated DDT.

The preference levels associated with $x_i$ can be specified in any number of ways. For the purposes of this disclosure, the following four attribute levels are specified in table 9:

TABLE 9

| Attribute Level | State |
|---|---|
| 0 | if N/A; |
| 1 | if the $OF_i$ for $a_i \in \mathcal{A}$ is within 1 hour of the DDT; |
| 2 | if, for $a_i \in \mathcal{A}$, 1-hr <$\lvert DDT - OF_i \rvert$ < 2-hrs; |
| 3 | if, for $a_i \in \mathcal{A}$, $\lvert DDT - OF_i \rvert$ > 2-hrs. |

This value function can be parameterized as follows:

$$v_5(0) = 0$$

$$v_5(1) = 0.9$$

$$v_5(2) = 0.7$$

$$v_5(3) = 0.4.$$

Furthermore, travel related queries that specify a desired arrival time (DAT) may be considered. In defining this attribute, as before, a constructed scale that measures the duration of period between the DAT of the consumer and the arrival time of a destination leg/flight (DF) of the travel itinerary is shown in table 10:

TABLE 10

| Attribute Level | State |
|---|---|
| 0 | If N/A; |
| 1 | if the $DF_i$ for $a_i \in \mathcal{A}$ is within 1 hour of the DAT; |
| 2 | if, for $a_i \in \mathcal{A}$, 1-hr <$\lvert DAT - DF_i \rvert$ < 2-hrs; |
| 3 | if, for $a_i \in \mathcal{A}$, $\lvert DAT - DF_i \rvert$ > 2-hrs. |

This value function can be parameterized as follows:

$$v_5(0) = 0$$

$$v_5(1) = 0.9$$

$$v_5(2) = 0.7$$

$$v_5(3) = 0.4.$$

Specification of Single-Attribute Value Functions—Hotels

The other attributes may include Hotel Chain, Star Rating, Smoking Preference, Bed Type, and the like.

For the Hotel Chain attribute ($h_1$), the indicator variable may be stated as follows:

$$v_{h_1} = \begin{cases} 0, & \text{if } x = N \\ 1, & \text{if } x = Y \end{cases}.$$

For the Star Rating attribute ($h_2$), the indicator variable may be stated as follows:

{0, 1, 2, 3, 4, 5, 6, 7}.

For the Smoking Preference attribute ($h_3$), the indicator variable may be stated as follows:

$$v_{h_3} = \begin{cases} 0, & \text{if } x = N \\ 1, & \text{if } x = Y \end{cases}.$$

For the Bed Type attribute ($h_4$), the Ask/Get Matrix may be used as discussed above.

The Hotel Name attribute ($h_5$) may be instantiated when the consumer mentions a hotel by name. If the hotel is available, the attribute has utility; if the hotel is unavailable, then the attribute has little or no utility.

Other Single-Attribute Value Functions relating to Origin and Destination may include country ($o_1$), city (o2), city code ($o_3$), airport code (o4), and so forth.

Numerical Case Study. Case: Flights—Only Itineraries

In an example embodiment, a travel related query, Q, is passed through the analytic framework of the system specified above. The travel related query may read as follows: "Roy and Jonathan want to travel non-stop from Toronto to Seattle on March 21st; we want business class seats, if possible; if possible, it would be nice to get there early enough in the evening to have dinner at Daniel's Broiler in Bellevue; as always, we prefer a wide-body plane."

The travel related query instantiates the following flight attributes: $F_1$ (since a flight itinerary is desired), $F_2$ (since a non-stop flight is desired), $F_3$ (since business class seats are desired), $F_4$ (since a wide-body plane is preferred), and $F_5$ (since a desired arrival time—"Supper"="Evening"—is specified). Therefore, this travel related query is closed under F, and, via Equation (7), gives rise to the following index set:

$$I_F = \{1, 2, 3, 4, 5\}.$$

At least one of the travelers (for example, Roy) may preliminarily create, on the back-end of the system, a user profile that contains personal rank-order preferences of the traveler for air carriers. Therefore, airline preferences of this traveler may be captured. Furthermore, the traveler may also preliminarily provide the rank-order preference information regarding the travel related attributes. Given this set of rankings, it may be determined that, when evaluating travel itinerary selection, the traveler assigns highest importance to obtaining a desired cabin class, followed by trip duration. Using these rank-order preferences, Equation (15) can be used to impute the RS weights shown below in table 11:

TABLE 11

| RAS - Flights | Rank | Rank Sum Weight |
|---|---|---|
| $F_1$ | 4 | 0.133 |
| $F_2$ | 2 | 0.267 |
| $F_3$ | 1 | 0.333 |
| $F_4$ | 5 | 0.067 |
| $F_5$ | 3 | 0.200 |

Figure 5:
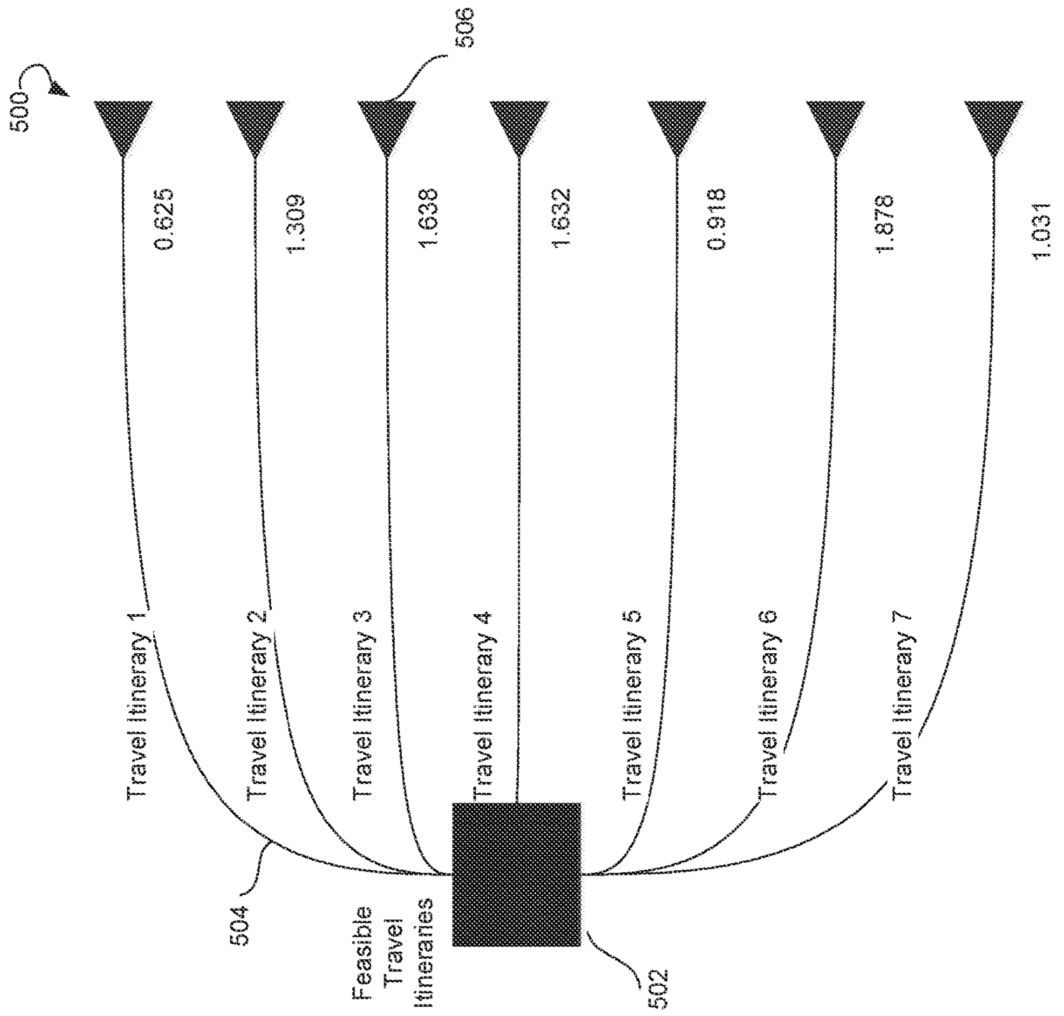
FIG. 5 is a graphical representation of travel itineraries found by a scheduler.

The scheduler may factor the preferences of the traveler into the search performed by the scheduler. FIG. 5. shows a representation 500 of travel itineraries found by the scheduler. In particular, the scheduler may perform the search in feasible travel itineraries 502. As a result of the search, travel itineraries 504 (shown as travel itineraries 1-7) may be found. Each of the travel itineraries 504 may have a weight 506.

Figure 6:
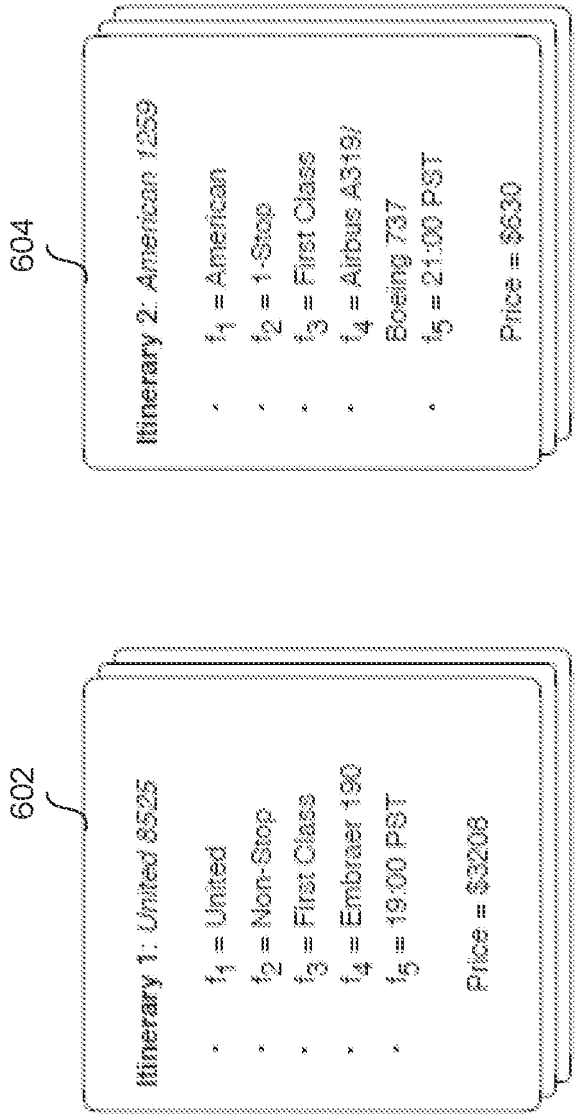
FIG. 6 shows results of a search performed by a scheduler.

The scheduler may return a result to the traveler. The result of the search is shown on FIG. 6. FIG. 6 shows a travel itinerary 602 and a travel itinerary 604. Each of the travel itinerary 602 and the travel itinerary 604 may have attribute values $f_1$, $f_2$, $f_3$, $f_4$, $f_5$.

Look-up tables stored in a database may be used to determine that the wide-body plane request is not satisfied in either of the travel itinerary 602 and the travel itinerary 604, and that the instantiated DAT is satisfied in the travel itinerary 602, but not in the travel itinerary 604.

Figure 7:
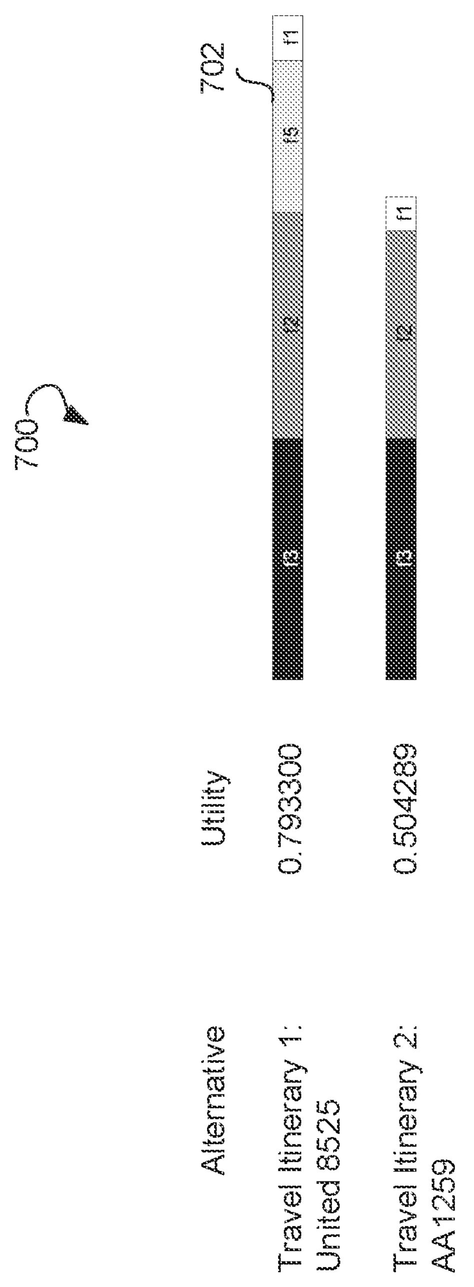
FIG. 7 illustrates a representation of numeric results of a search performed by a scheduler.

FIG. 7 shows an implementation 700 of the relevant portion of Equation (14), which yields the set of numeric results graphically illustrated below. As shown on FIG. 7, travel itinerary 1 (corresponds to travel itinerary 602 shown on FIG. 6) is ranked higher than travel itinerary 2 (corresponds to travel itinerary 604 shown on FIG. 6), primarily due to the fact that travel itinerary 1 scores better on the DAT attribute 702 (attribute $f_5$). Given rank-order importance ($3^{rd}$) of this attribute in overall ranking of flight attributes of the traveler, together with the fact that travel itinerary 2 is a 1-stop flight, these numeric results square with a decision of the desirability of travel itinerary 1 over travel itinerary 2.

Multiattribute Valuation and Costing of Options

The system 200 may assign determinate multiattribute scores to the individual choice set options described above along with providing determinate cost estimates for each option.

Choice Set A. Among the four options that the consumer considers within this particular choice set, the subway options is by far the cheapest, but provides the consumer the least utility, owing mainly to its lack of convenience, the need to allow for additional time to get to the subway station, and the fact that the consumer need to physically carry the luggage to the subway station. The Uber option is preferred over the taxi option, due mainly to cost and convenience considerations. Finally, the Uber-Black option is the priciest option, but it provides the consumer the greatest level of utility, due mainly to the tangible benefits that the consumer derives from the luggage handling and the overall level of service. These preferences and judgements are represented numerically in the vector shown below, together with the relevant cost data associated with the options considered in this choice set:

A: [(0.3; $4:50); (0.6; $30); (0.45; $37); (0.9; $47)];

where each ordered pair contains the aggregate multiattribute score and the determinate cost value, respectively, for each $a_i \in A$, for $i=1, \ldots, 4$. A similar notation is used for the choice set values described below.

Choice Set B. The measurable value function used for this decision category follows a fairly linear progression in its treatment of performance vs. price:

B: [(0.2; $299); (0.45; $450); (0.6; $535); (0.7; $600); (0.95; $800)].

Choice Set C. In valuing the options contained in this choice set, the consumer appraises the tradeoffs between benefit versus cost. Looking at the three options contained in this choice set, the consumer may note that the taxi is almost always readily available in the city the consumer is traveling to, but is, on average, slightly more expensive than using Uber. This latter option, though, may typically entail a wait time of some (unknown) duration, and may sometimes even require the consumer to meet the driver at a convenient intersection. The rental car option has some attraction, but also comes with hassles for the consumer, for example, picking up and dropping-off the rental vehicle near the airport, as well as the additional cost and hassle of finding public parking, etc.:

C: [(0.3; $300); (0.6; $280); (0.75; $373)].

Choice Set D. The measurable value function used here is, for the most part, linear in its treatment of performance versus price. For option $d_3$, however, the value function captures the fact that the price savings inherent to this option come with a specific risk, namely, the consumer lacks first-hand familiarity with this particular hotel property, and therefore values that option slightly less than its "known" counterpart:

D: [(0.3; $350); (0.6; $475); (0.56; $425); (0.9; $550)].

Choice Set E. The measurable value function of choice set E is similar to the one used for choice set B, but, nevertheless, admits the possibility that differences may exist for the preferences of the consumer concerning outbound versus return flight itineraries. Accordingly, for this example, the higher performing options are scored higher than they were for choice set B, owing to the fact that the consumer envisions being tired after meetings of the consumer, and is likely to value the higher level of service more than in the case of the outbound flight:

E: [(0.1; $299); (0.45; $450); (0.7; $535); (0.8; $600); (0.95; $800)].

Choice Set F. Similar to the situation described above for choice set E, the consumer envisions that a state of mind of the consumer may be such that lower performing options are less desirable to the consumer in the latter portion of the trip than they were for the outbound portion. Similarly, the taxi option is also valued less than before, in anticipation of possibly long lines and/or wait times for a taxi in the late evening of the anticipated arrival of the consumer back home:

F: [(0.2; $4:50); (0.65; $30); (0.3; $37); (0.9; $47)].

Specification of Constraints—Budgetary and Otherwise

In the travel-specific example above, budget may be the constraint with which the consumer is most concerned. The total budgeted amount for the purchase of an entire travel itinerary is denoted by C. C can be constructed as the sum total of r individually specified budget constraints, where r is the total number of decision groups under consideration by the consumer. Another type of constraint is how each individual portfolio group is treated within the overall context of an itinerary portfolio evaluation. In the travel-specific example above, it can be assumed that the consumer selects one (and only one) option from the constructed choice set associated with each portfolio group. In other embodiments, this assumption can be relaxed to make such choices optional (for example, the system 200 may dictate that an option from a given portfolio group is included in a feasible portfolio allocation if its inclusion maximizes the objective function of the consumer and the option satisfies all of the relevant and/or specified constraints). In another embodiment, the constraints imposed can be made explicitly conditional, so that a given option (or a set of options) may be only selected if certain logical conditions are met. For example, the consumer may consider the purchase of a spa package, which is only available for purchase if the consumer stays at a particular hotel. Such conditions can take many forms, e.g., either-or constraints, K-out-of-N constraints, and so forth.

Itinerary Portfolio Evaluation—Optimization Approach

Having fully specified and enumerated the itinerary portfolio, the system 200 can numerically evaluate the portfolio to explore the prescriptive implications of the itinerary portfolio evaluation. The system 200 can structure the numerically evaluated portfolio in a visual representation, such as in FIG. 8. FIG. 8 is a schematic diagram 800 illustrating an itinerary portfolio structure, according to an example embodiment. In FIG. 8, each of rows 802, 804, 806, 808, and 810 corresponds to the portfolio groups also referred to as attributes. Within each portfolio group—labeled A, B, C, D, F—the individual options associated with each choice set are depicted, as well as the value 812 (i.e., the score based on the weighted attribute) and cost data 814, providing the consumer with a quick at-a-glance view of the entire itinerary decision space under consideration.

Using the itinerary decision space of FIG. 8, the system 200 may identify portfolio allocations that represent greatest overall value for the consumer, consistent with the articulated goals, objectives, preferences, and constraints of the consumer. For example, suppose that the consumer wishes to select one option from each of the six portfolio groups described above in such a way that the itinerary value is maximized and that her total itinerary cost does not exceed $1,900.

The system 200 may analyze the specified set of values yielding the following optimal portfolio allocation:

($a_4$; $b_1$; $c_3$; $d_4$; $e_3$; $f_4$).

This particular portfolio allocation yields an itinerary portfolio value of 4.35, for a total cost to the consumer of $1,853—just shy of the $1,900 budget constraint specified by the consumer.

In another example embodiment, the consumer may wonder how changes in the available budget may affect the itinerary prescriptions for the trip of the consumer. The system 200 may iteratively analyze itineraries across a range of possible budget constraints and identify an optimal itinerary at each constraint. For example, the consumer may wish to consider a finite set of possible budget constraints, ranging from $1,300 to $2,800, in increments of $100. The optimal itinerary portfolio allocations derived by the system 200 from the iterative process are shown in Table 12:

| Budget | Max. value | Attributes | Cost |
|---|---|---|---|
| $1300 | 2.45 | (a1, b1, c2, d1, e1, f2) | $1,288 |
| $1400 | 3.25 | (a4, b1, c2, d3, e1, f4) | $1,397 |
| $1500 | 3.40 | (a4, b1, c3, d3, e1, f4) | $1,492 |
| $1600 | 3.65 | (a4, b1, c2, d2, e2, f4) | $1,598 |
| $1700 | 3.95 | (a4, b1, c2, d4, e2, f4) | $1,673 |
| $1800 | 4.20 | (a4, b1, c2, d4, e3, f4) | $1,758 |
| $1900 | 4.35 | (a4, b1, c3, d4, e3, f4) | $1,853 |
| $2000 | 4.60 | (a4, b3, c2, d4, e3, f4) | $1,994 |
| $2100 | 4.75 | (a4, b3, c3, d4, e3, f4) | $2,089 |
| $2200 | 4.85 | (a4, b3, c3, d4, e4, f4) | $2,154 |
| $2300 | 4.95 | (a4, b4, c3, d4, e4, f4) | $2,219 |
| $2400 | 5.10 | (a4, b5, c3, d4, e3, f4) | $2,354 |
| $2500 | 5.20 | (a4, b5, c3, d4, e4, f4) | $2,419 |
| $2600 | 5.20 | (a4, b5, c3, d4, e4, f4) | $2,419 |
| $2700 | 5.35 | (a4, b5, c3, d4, e5, f4) | $2,619 |
| $2800 | 5.35 | (a4, b5, c3, d4, e5, f4) | $2,619 |

Table 12 provides a basis for bringing value-for-money considerations into decision making calculus concerning the selection of itinerary elements. For each specified budget constraint, the feasible itinerary portfolio allocation is Pareto efficient, in the sense that (i) for each itinerary portfolio, there does not exist a better performing portfolio for less cost; and (ii) for each $100 incremental addition to the budget constraint, the prescribed itinerary portfolio allocation represents the best possible use of additional capital.

Figure 9:
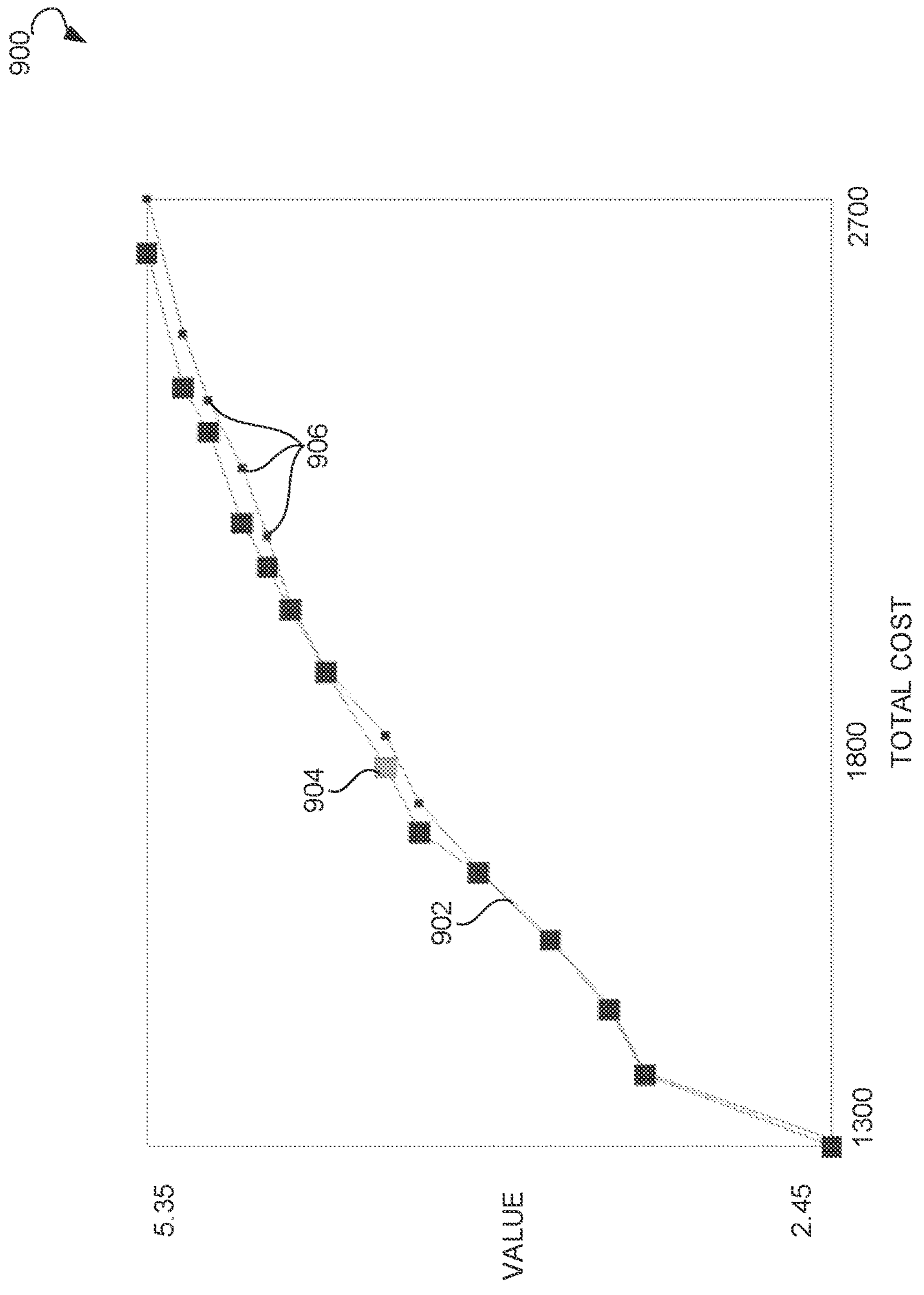
FIG. 9 illustrates a graphical representation of values associated with each feasible travel itinerary, according to an example embodiment.

FIG. 9 depicts a graphical representation 900 of a Pareto-type curve 902, according to an example embodiment. For the Pareto-type curve 902, the values associated with each optimal itinerary portfolio allocation are taken and value versus cost are plotted. The Pareto curve 902 plots 14 optimal itinerary portfolios of Table 12 (leaving out the two portfolios—$2,600 and $2,800—that do not yield an improvement in portfolio value), and reveals several insights. First, as indicated earlier, each point depicted on the Pareto-type curve 902 is Pareto efficient, in the sense that, for the specified budget constraint, the itinerary portfolio value represents maximal value for the consumer, i.e., the itinerary value cannot be bettered for less cost. Second, for this particular itinerary portfolio specification, the consumer begins to reach diminishing returns somewhere around the $1,800-1,900 mark (shown by element 904). At the same time, it can be noted that the consumer achieves greatest value-for-money between $1,300-1,700. In the Pareto-type curve 902, elements 906 located to the right of some of the itinerary portfolios indicate those portfolio allocations where the entire budget allocation is not utilized (within some specified percentage; for example, instances where more than 3% of the budget allocations goes unutilized are noted by the elements 906).

Both Table 12 and FIG. 9 provide consumers with a number of valuable decision-aiding insights. The system 200 allows consumers to rule out numerous possible itinerary choices that under-perform relative to better performing portfolio allocations that the system 200 identifies, and that are seen to lie along the Pareto efficient frontier. The analysis performed by the system 200 may provide consumers with prescriptive guidance and direction as to where "biggest bang-for-their-buck" is had within a specified itinerary portfolio. The system 200 is also capable of revealing the inverse situation, i.e., instances where the consumer may—to the extent that the Pareto analysis reveals that diminishing marginal returns have been reached within a given portfolio specification—possibly be overspending (in the sense that the consumer sees little, if any, additional value for each additional incremental expenditure of capital). The practical insights provided by the system 200 aid the consumer's efforts—within the overall context of the travel planning process to arrive at a requisite decision state in the most efficient manner possible.

The system 200 may utilize integer programming (IP) to optimize travel itineraries. IPs represent a broad class of constrained optimization problems where some or all of the variables are integers, and where the objective function and constraints are typically linear. In some embodiments, knapsack problem (KP) models or multiple choice knapsack problem (MCKP) models, which are specific classes of IPs, are utilized within the system.

An MCKP model used within the system 200 is formally stated as follows:

$$\text{Maximize:} \sum_{t \in K} \sum_{j=1}^{n_t} b_{tj} x_{tj} \quad (16)$$

$$\text{Subject to:} \sum_{t \in K} \sum_{j=1}^{n_t} c_{tj} x_{tj} \le d \quad (17)$$

-continued $$\sum_{j=1}^{n_t} x_{tj} = 1 \quad t \in K = \{1, 2, \ldots, \kappa\} \tag{18}$$

$$c_{tj} \in \{0, 1\} \quad t \in K, j \in S_t = \{1, 2, \ldots, n_t\},$$

$$b_{tj}, c_{tj}, d \geq 0, \quad c_{tj} < d, t \in K, j \in S_t$$

where the itinerary portfolio is assumed to consist of K categories or groups. Associated with each category t, where $t \in K=\{1, 2, \ldots, K\}$, is a choice set that consists of $n_t$ options. In this model, exactly one option is selected from each choice set. In some embodiments, exactly one option is required to be selected from each choice set. The cost and the multiattribute score associated with each option j, $j \in S_t=\{1, 2, \ldots, n_t\}$, in category t, are assessed as $c_{tj}$ and $b_{tj}$, respectively. The total budget to be allocated across all $\kappa$ categories is capped by a fixed, determinate allocation, d. Finally, the decision variables in the model are defined as $x_{tj}=1$, if option j ($j \in S_t$), in choice set t ($t \in K$), is selected, or as $x_{tj}=0$, otherwise.

Equation (16) computes the overall value of a given itinerary portfolio allocation (a value to be maximized); Equation (17) represents a constraint commonly referred to as the resource constraint or budget constraint. The constraints that are given by Equation (18) are commonly referred to as the multiple choice constraints. Finally, consistent with the previous usage and overall formulation, sets $S_t$, $t \in K$, shall be referred to as the choice sets that collectively comprise a given itinerary portfolio.

Figure 10:
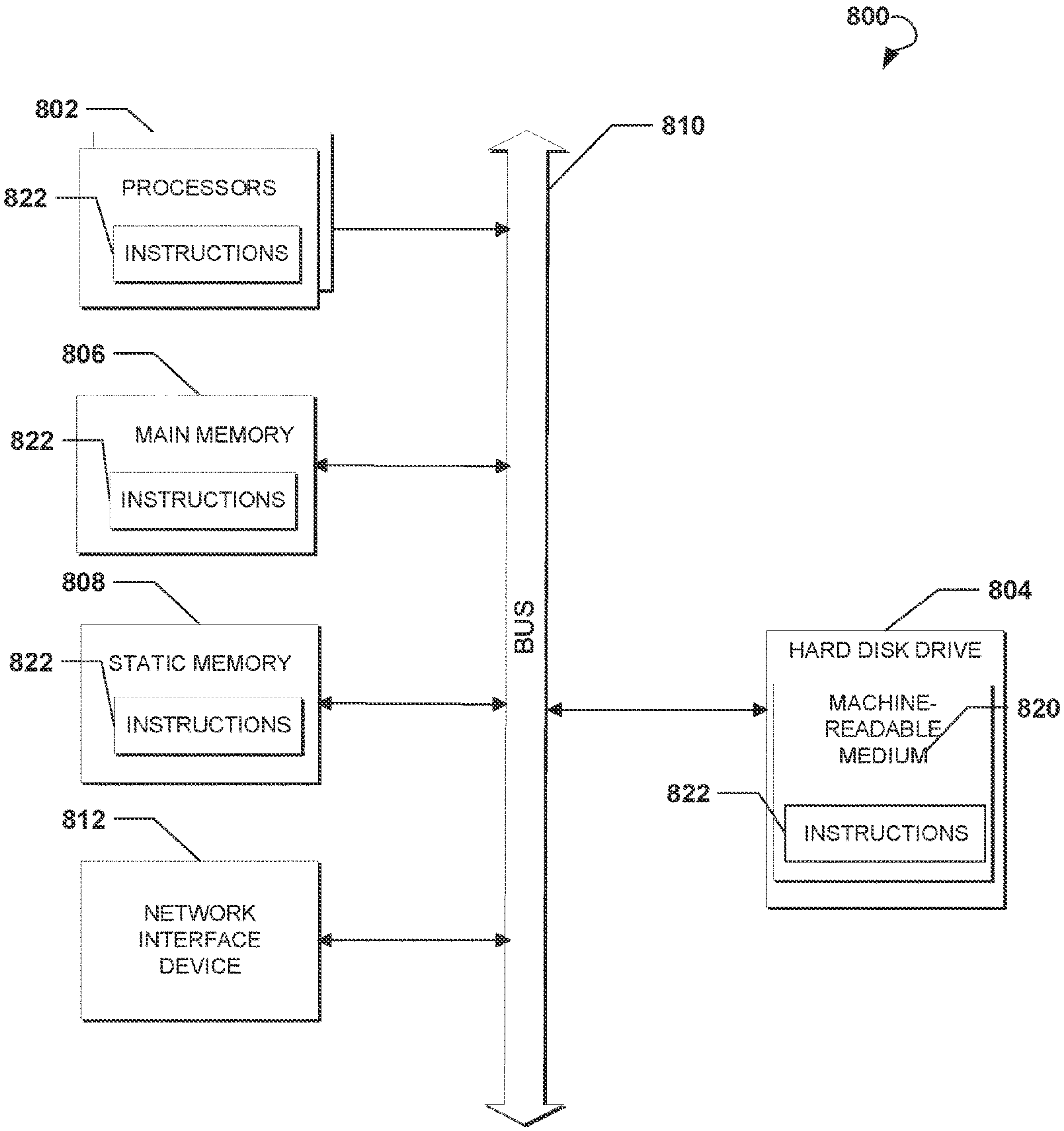
FIG. 10 shows a diagrammatic representation of a computing device for a machine in the exemplary electronic form of a computer system, within which a set of instructions for causing the machine to perform any one or more of the methodologies discussed herein can be executed.

FIG. 10 shows a diagrammatic representation of a computing device for a machine in the exemplary electronic form of a computer system 1000, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a PC, a tablet PC, a set-top box, a cellular telephone, a digital camera, a portable music player (e.g., a portable hard drive audio device, such as an Moving Picture Experts Group Audio Layer 3 player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor or multiple processors 1002, a hard disk drive 1004, a main memory 1006, and a static memory 1008, which communicate with each other via a bus 1010. The computer system 1000 may also include a network interface device 1012. The hard disk drive 1004 may include a computer-readable medium 1020, which stores one or more sets of instructions 1022 embodying or utilized by any one or more of the methodologies or functions described herein. The instructions 1022 can also reside, completely or at least partially, within the main memory 1006 and/or within the processors 1002 during execution thereof by the computer system 1000. The main memory 1006 and the processors 1002 also constitute machine-readable media.

While the computer-readable medium 1020 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks, Random Access Memory (RAM), Read-Only Memory (ROM), and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems.

In some embodiments, the computer system 1000 may be implemented as a cloud-based computing environment, such as a virtual machine operating within a computing cloud. In other embodiments, the computer system 1000 may itself include a cloud-based computing environment, where the functionalities of the computer system 1000 are executed in a distributed fashion. Thus, the computer system 1000, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners, or such systems may be accessible to outside users who deploy applications within the computing infrastructure to obtain the benefit of large computational or storage resources.

The cloud may be formed, for example, by a network of web servers that comprise a plurality of computing devices, such as a client device, with each server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire, and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk, any other optical medium, any other physical medium with patterns of marks or holes, a RAM, a Programmable Read-Only Memory, an Erasable Programmable Read-Only Memory (EPROM), an Electrically Erasable Programmable Read-Only Memory, a FlashEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

The corresponding structures, materials, acts, and equivalents of all means or steps plus function elements in the claims below are intended to include any structure, material, or act for performing the function in combination with other claimed elements as specifically claimed. The description of the present technology has been presented for purposes of illustration and description, but is not intended to be exhaustive or limited to the disclosure. Many modifications and variations will be apparent to those of ordinary skill in the art without departing from the scope and spirit of the disclosure. Exemplary embodiments were chosen and described in order to best explain the principles of the present technology and its practical application, and to enable others of ordinary skill in the art to understand the disclosure for various embodiments with various modifications as are suited to the particular use contemplated.

Aspects of the present technology are described above with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Thus, computer-implemented methods and systems for facilitating travel reservations are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A system for evaluating travel itineraries, the system comprising:
- a scheduler in communication with a processor and operable to:
  - instantiate at least two travel attributes in terms of a travel lexicon, thereby generating at least two instantiated travel attributes;
- a parser in communication with the processor and operable to:
  - parse a natural language travel-related query received via a user interface displayed on a user device to derive at least one constraint related to the set of feasible itineraries and to derive a vector function comprising at least two instantiated attribute values;
- the processor in communication with the scheduler and the parser, the processor operable to:
  - receive the travel lexicon having attribute names and related values for flights, hotels, origins, and destinations;
  - receive a travel taxonomy comprising logical relations and predicates;
  - receive the set of feasible itineraries;
  - evaluate a utility value for each feasible itinerary in the set of feasible itineraries by:
    - ranking the at least two instantiated attribute values based on encoded preference information derived from a set of user preferences, thereby generating a ranking that represents a relative importance of each of the instantiated travel attributes; and
    - assigning weights to each of the at least two instantiated attribute values based on the ranking to create the at least two attribute weights;
  - associate the utility value to each of the feasible travel itineraries based on the at least two attribute weights and a value score corresponding to a performance of the feasible travel itinerary under each of the instantiated travel attributes;
  - evaluate the feasible travel itineraries based at least in part on the at least two attribute weights for each of the feasible travel itineraries; and
  - generate a visual representation for display on the user device, the visual representation showing the value scores for the feasible travel itineraries across a range of the at least one constraint;

wherein the processor is further configured to select, from the set of feasible travel itineraries, based on the at least one constraint, an optimal travel itinerary to be provided to the user.

2. The system of claim 1, wherein the instantiating the at least two travel attributes comprises ascertaining at least one relevant attribute set of the query, the at least one relevant attribute set comprising at least two attribute values selected from the plurality of travel attributes based on a context of the travel-related query in the travel taxonomy.

3. The system of claim 2, wherein the scheduler is further operable to index the plurality of instantiated travel attributes, thereby generating an attribute index comprising a plurality of indexed travel attributes in terms of the travel lexicon, and wherein the associating the utility value to each of the feasible travel itineraries is further based on the attribute index.

4. The system of claim 1, wherein the associating the utility value to each of the feasible travel itineraries based on the at least two weighted attributes further comprises indexing the plurality of instantiated travel attributes, thereby generating an attribute index comprising a plurality of indexed travel attributes in terms of the travel lexicon.

5. The system of claim 1, wherein the set of user preferences comprises relative importances assigned to at least one of the travel attributes.

6. The system of claim 1, wherein the processor is further operable to associate cost data with at least one of the at least two attribute weights and evaluating the set of feasible travel itineraries is further based on the cost data associated with at least one of the at least two attribute weights.

7. The system of claim 1, wherein the processor is further configured to adjust the evaluation of the feasible travel itineraries based on forecasted weather conditions at a time of travel.

8. The system of claim 1, wherein the set of user preferences comprises preferences for a plurality of different users.

9. The system of claim 1, wherein at least one user preference in the set of user preferences is determined based on one or more of the following: preexisting selections of the user and preexisting selections of one or more further users.

10. A method for evaluating travel itineraries, the method comprising:

receiving (a) a travel lexicon having attribute names and related attribute values for flights, hotels, origins, and destinations, and (b) a travel taxonomy comprising logical relations and predicates;

receiving a set of feasible itineraries;

instantiating at least two travel attributes in terms of the travel lexicon, thereby generating at least two instantiated travel attributes;

parsing a natural language travel-related query received via a user interface displayed on a user device to derive at least one constraint related to the set of feasible itineraries and to derive a vector function comprising the at least two instantiated attribute values;

evaluating a utility value for each feasible itinerary in the set of feasible itineraries by:

ranking the at least two instantiated attribute values based on encoded preference information derived from a set of user preferences, thereby generating a ranking that represents a relative importance of each of the instantiated travel attributes; and assigning weights to each of the at least two instantiated attribute values based on the ranking to create at least two attribute weights; and generating a visual representation for display on the user device, the visual representation showing the value scores for the feasible travel itineraries across a range of the at least one constraint;

associating the utility value to each of the feasible travel itineraries based on the at least two attribute weights and a value score corresponding to a performance of the feasible travel itinerary under each of the instantiated travel attributes; and evaluating, by a computing system, the feasible travel itineraries based at least in part on the at least two attribute weights for each of the feasible travel itineraries; and selecting, from the set of feasible travel itineraries, based on the at least one constraint, an optimal travel itinerary to be provided to the user.

11. The method of claim 10, wherein the instantiating the at least two travel attributes comprises ascertaining at least one relevant attribute set, the at least one relevant attribute set comprising at least two attribute values selected from the plurality of travel attributes based on a context of the travel-related query in the travel taxonomy.

12. The method of claim 11, wherein the at least one relevant attribute set comprises at least two relevant attribute sets.

13. The method of claim 10, further comprising indexing the plurality of instantiated travel attributes, thereby generating an attribute index comprising a plurality of indexed travel attributes in terms of the travel lexicon, and wherein the associating the utility value to each of the feasible travel itineraries is further based on the attribute index.

14. The method of claim 10, wherein the set of user preferences comprises relative importances assigned to at least one of the travel attributes.

15. The method of claim 10, further comprising associating cost data with at least one of the at least two attribute weights and evaluating the set of feasible travel itineraries is further based on the cost data associated with at least one of the at least two attribute weights.

16. The method of claim 10, further comprising adjusting the evaluation of the feasible travel itineraries based on forecasted weather conditions at a time of travel.

17. The method of claim 10, wherein the set of user preferences comprises preferences for a plurality of different users.

18. The method of claim 10, wherein at least one user preference in the set of user preferences is determined based on one or more of the following: preexisting selections of the user and preexisting selections of one or more further users.

* * * * *